(12) United States Patent
Gotoh et al.

(10) Patent No.: US 11,531,431 B2
(45) Date of Patent: Dec. 20, 2022

(54) INFORMATION PROCESSING DEVICE AND INFORMATION PROCESSING METHOD

(71) Applicant: SONY GROUP CORPORATION, Tokyo (JP)

(72) Inventors: Kenji Gotoh, Tokyo (JP); Atsushi Irie, Tokyo (JP); Yugo Sato, Tokyo (JP); Junji Otsuka, Tokyo (JP); Tetsuo Ikeda, Tokyo (JP); Seishi Tomonaga, Tokyo (JP); Eisuke Fujinawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/310,706

(22) PCT Filed: Dec. 11, 2019

(86) PCT No.: PCT/JP2019/048400
§ 371 (c)(1),
(2) Date: Aug. 18, 2021

(87) PCT Pub. No.: WO2020/174808
PCT Pub. Date: Sep. 3, 2020

(65) Prior Publication Data
US 2022/0050550 A1 Feb. 17, 2022

(30) Foreign Application Priority Data
Feb. 27, 2019 (JP) .............................. JP2019-033603

(51) Int. Cl.
*G06F 3/042* (2006.01)
*G06F 3/01* (2006.01)
*G06F 3/038* (2013.01)

(52) U.S. Cl.
CPC ............ *G06F 3/0425* (2013.01); *G06F 3/011* (2013.01); *G06F 3/038* (2013.01)

(58) Field of Classification Search
CPC ........ G06F 3/0425; G06F 3/011; G06F 3/038; G06F 3/017; G06F 3/0481; G06F 3/0488
See application file for complete search history.

(56) References Cited

U.S. PATENT DOCUMENTS 5,455,906 A   10/1995 Usuda
2009/0122023 A1   5/2009 Kikuoka
(Continued)

FOREIGN PATENT DOCUMENTS

CN   101436115 A   5/2009
DE   69317153 T2   6/1998
(Continued)

OTHER PUBLICATIONS

International Search Report and Written Opinion of PCT Application No. PCT/JP2019/048400, dated Mar. 3, 2020, 09 pages of ISRWO.

*Primary Examiner* — Bryan Earles
(74) *Attorney, Agent, or Firm* — Chip Law Group

(57) ABSTRACT

Provided is an information processing device that includes a control unit that sets an input auxiliary region based on an acquired sensing result of an operator and display a starting point of an input start within the input auxiliary region when the input start performed using the operator is detected.

16 Claims, 30 Drawing Sheets

(56) References Cited

U.S. PATENT DOCUMENTS

2011/0270824 A1* 11/2011 Morris ................ G06F 16/9038
    715/830
2015/0062004 A1* 3/2015 Rafii ........................ G06F 3/011
    345/156
2015/0126167 A1 5/2015 Ikeda et al.
2015/0302617 A1* 10/2015 Shimura ............... G06T 11/203
    345/441

FOREIGN PATENT DOCUMENTS

| EP | 0572031 A1 | 12/1993 |
|---|---|---|
| EP | 2869275 A1 | 5/2015 |
| JP | 05-330289 A | 12/1993 |
| JP | 2009-122837 A | 6/2009 |
| JP | 2015-052953 A | 3/2015 |
| JP | 2015-090524 A | 5/2015 |
| JP | 2016-194762 A | 11/2016 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/048400 filed on Dec. 11, 2019, which claims priority benefit of Japanese Patent Application No. JP 2019-033603 filed in the Japan Patent Office on Feb. 27, 2019. Each of the above-referenced applications is hereby incorporated herein by reference in its entirety.

TECHNICAL FIELD

The present disclosure relates to an information processing device, an information processing method, and a program.

BACKGROUND ART

Display of various kinds of information on a plane such as a table using a projector has been proposed (for example, see PTL 1).

CITATION LIST

Patent Literature

[PTL 1]
JP 2016-194762 A

SUMMARY

Technical Problem

In the technology disclosed in PTL 1, when a shielding object such as a hand or a pen is located between a projector and a plane such as a table, there is concern of information projected by the projector being difficult to see due to the shade of the shielding object.

The present disclosure has been devised in view of the above-described circumstances and an objective of the present disclosure is to provide an information processing device, an information processing method, and a program capable of reducing an influence of a shielding object as much as possible.

Solution to Problem

The present disclosure is, for example, an information processing device including: a control unit configured to set an input auxiliary region based on an acquired sensing result of an operator and display a starting point of an input start within the input auxiliary region when the input start performed using the operator is detected.

The present disclosure is, for example, an information processing method including: allowing a control unit to set an input auxiliary region based on an acquired sensing result of an operator and display a starting point of an input start within the input auxiliary region when the input start performed using the operator is detected.

The present disclosure is, for example, a program causing a computer to perform: an information processing method allowing a control unit to set an input auxiliary region based on an acquired sensing result of an operator and display a starting point of an input start within the input auxiliary region when the input start performed using the operator is detected.

DESCRIPTION OF EMBODIMENTS

Hereinafter, embodiments of the present disclosure will be described with reference to the drawings. The description will be made in the following order.

<Overview of present disclosure>
<First embodiment>
<Second embodiment>
<Third embodiment>
<Fourth embodiment>
<Modification examples>

Embodiments to be described below are preferred specific examples of the present disclosure and content of the present disclosure is not limited to these embodiments.

Overview of Present Disclosure

Figure 1A:
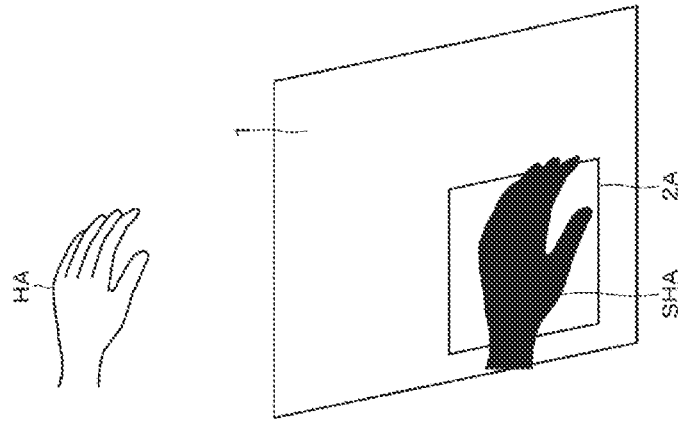
FIGS. 1A, 1B, and 1C are diagrams that will be referred to when an overview of the present disclosure is described.

First, to facilitate understanding of the present disclosure, an overview of the present disclosure will be described with reference to FIGS. 1A, 1B and 1C. FIG. 1A illustrates, for example, a table 1 on which a variety of information is displayed on a top surface by a projector provided above it. In the following description, displaying a variety of information on a projection surface using a projector is appropriately referred to as projecting and displaying or drawing the information.

In a predetermined portion of the table 1, a window (for example, a window 2A) is set as an input auxiliary region. The window is a region in which information corresponding to an input performed using an operator such as a hand or a pen (in this example, a hand HA) is projected and displayed. As illustrated in FIG. 1A, information may not be able to be projected and displayed within the window 2A due to a shade region SHA of the hand HA used to hover above the table 1 to perform an input operation. For example, in a case in which an operation of drawing a character or a picture in a space with a finger or a pen is performed and content in accordance with the operation is projected and displayed, when the content is projected and displayed immediately below the position of the finger or the pen, the projected and displayed content may be shielded by the shade region SHA of the hand HA.

Figure 1B:
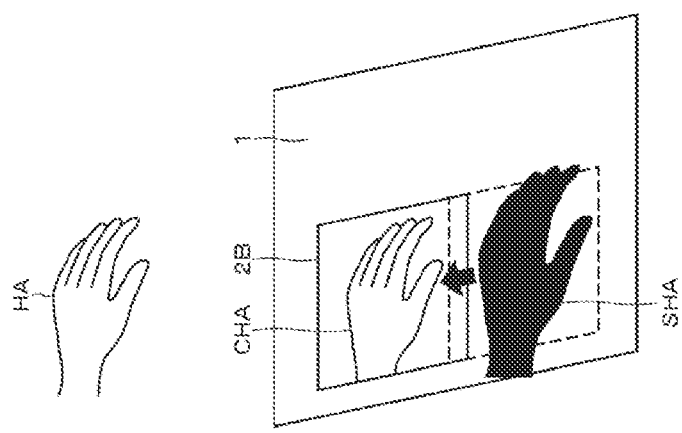
Figure 1C:
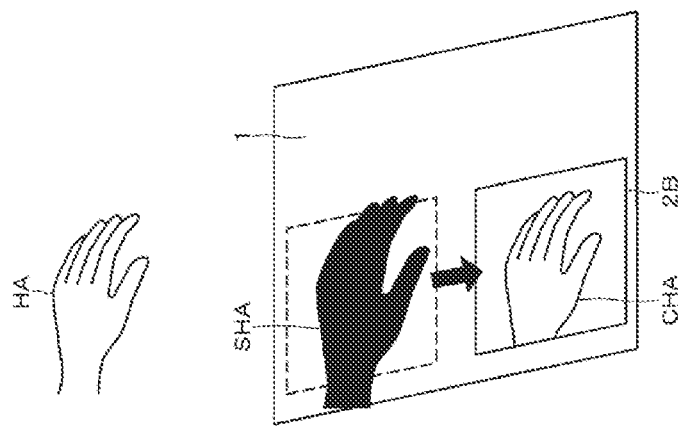

Accordingly, in the present disclosure, for example, as schematically illustrated in FIG. 1B, a window 2B is set at a position at which the shade region SHA is avoided. A hand CHA generated by computer graphics (CG) is projected and displayed within the window 2B so that the user can intuitively recognize the hand. As schematically illustrated in FIG. 1C, even when the position of the window 2B is changed to avoid the shade region SHA, a relative positional relation between the window 2B and the CG hand CHA is maintained. Thus, input information in accordance with an input performed using the operator, for example, the hand HA, can be displayed within the window 2B without being shielded by the shade region SHA. Hereinafter, the details of each embodiment of the present disclosure will be described.

First Embodiment

Configuration Example of Information System

Figure 2:
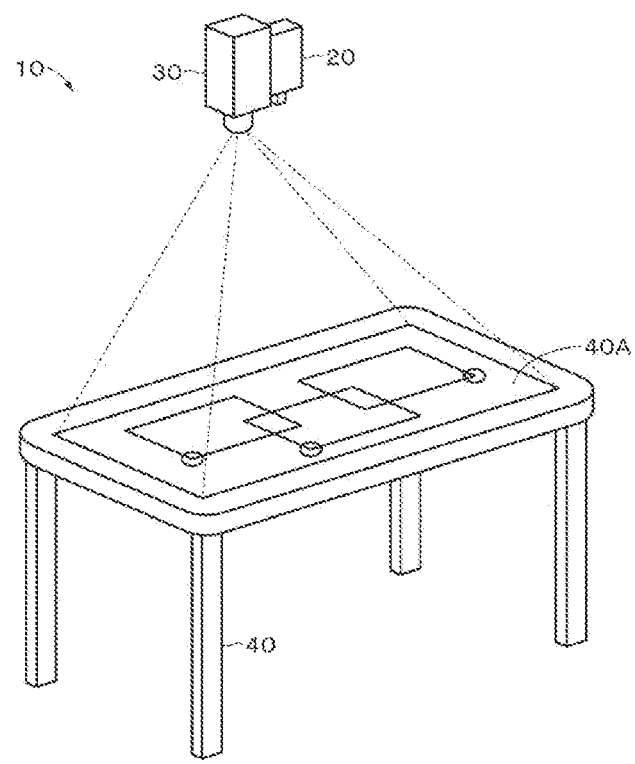
FIG. 2 is a diagram illustrating a configuration example of an information processing system according to a first embodiment.

FIG. 2 is a diagram illustrating a configuration example of an information processing system (an information processing system 10) according to a first embodiment. The information processing system 10 according to the embodiment includes an input unit 20 and an output unit 30. The information processing system 10 illustrated in FIG. 2 is a system that displays input information which is information input using an operator on a top surface 40A of the table 40. The input information may be any of a character, a number, a figure, a picture drawn by a user, a straight line, a curved line, a pattern, and the like forming the character or the like. A scheme of displaying information on the top surface 40A of the table 40 as in FIG. 2 is also referred to as a "projection scheme".

The input unit 20 is a device, that is, a sensor, that inputs the shape of the hand HA of the user using the information processing system 10, operation content of the hand HA, and the shape or pattern of an object put on the top surface 40A of the table 40. In the example illustrated in FIG. 2, the input unit 20 is provided above the table 40, for example, in a state in which the input unit 20 is suspended from a ceiling and is provided to be separated from the table 40 which is an information display target. As the input unit 20, for example, a camera that images the table 40 using one lens, a stereo camera that can image the table 40 using two lenses and record information in a depth direction (depth information), or the like can be used.

When a camera that images the table 40 using one lens is used as the input unit 20, the information processing system 10 can recognize an object put on the table 40 by analyzing an image captured by the camera. When a stereo camera is used as the input unit 20, the input unit 20 can acquire depth information. When the input unit 20 acquires the depth information, the information processing system 10 can recognize, for example, a hand located above the table 40 or an object or the like put on the top surface 40A. When the input unit 20 acquires the depth information, the information processing system 10 can recognize a touch or an approach of a hand of the user to the table 40 and recognize withdrawing of the hand from the table 40. The input unit 20 may not necessarily be provided at a position facing the table 40 and may be provided, for example, at each of the four corners of the table 40.

The output unit 30 is a device that displays input information which is input by the input unit 20 and is based on an input operation of the user using the information processing system 10 on the top surface 40A of the table 40 or outputs a sound. For example, a projector, a speaker, or the like is used as the output unit 30. The example illustrated in FIG. 2 is an example in which the output unit 30 includes at least a projector and the output unit 30 projects and displays input information or a starting point or the like of an input start from above the top surface 40A of the table 40.

Although not illustrated in FIG. 2, another device may be connected to the information processing system 10. For example, an illumination device that illuminates the table 40 may be connected to the information processing system 10. When the illumination device is connected to the information processing system 10, the information processing system 10 can control a lighting state of the illumination device in accordance with a state of information display surface.

Logical Configuration Example of Information Processing System

Figure 3:
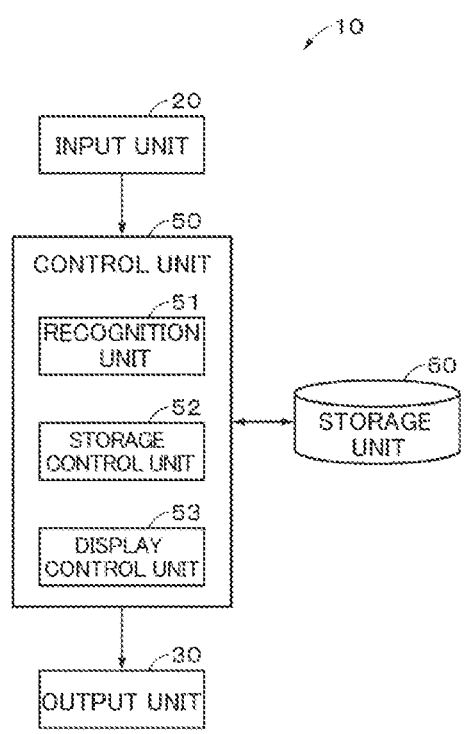
FIG. 3 is a block diagram illustrating a logical configuration example of the information processing system according to the first embodiment.

FIG. 3 is a block diagram illustrating a logical configuration example of the information processing system 10 according to the embodiment. As illustrated in FIG. 3, the information processing system 10 according to the embodiment includes a control unit 50 and a storage unit 60 in addition to the input unit 20 and the output unit 30 described above. The control unit 50 includes a recognition unit 51, a storage control unit 52, and a display control unit 53 as functions. The information processing device according to the present disclosure is configured as a device that includes at least the control unit 50.

(Input Unit)

The input unit 20 has a function of receiving an input of a variety of information to the input unit 20 (a sensing function). For example, the input unit 20 has a function of an image sensor imaging the table 40 and a depth sensor acquiring depth information on the table 40, as described above. A range in which information is displayed by the output unit 30 and a range in which the input unit 20 receives an input of information may be the same or different. For example, the input unit 20 can acquire image data, depth information, or the like in which a range broader than a display range of the output unit 30 is a target.

A visible light camera or an infrared camera can be exemplified as the image sensor. As the depth sensor, a stereo camera, a time of flight (TOF) type ranging sensor, a structured light type ranging sensor, or the like can be exemplified. The input unit 20 may include a biological sensor that acquires biological information such as a temperature, perspiration, or a pulse of a user or an environmental sensor that acquires an ambient temperature, humidity, or a wind speed.

(Output Unit)

The output unit 30 has a function of outputting input information under the control of the control unit 50, specifically, the display control unit 53. For example, the output unit 30 functions to project and display the input information and a starting point of an input start in accordance with a display control signal generated by the display control unit 53. The output unit 30 according to the embodiment includes at least a projector.

(Control Unit)

The control unit 50 functions as an arithmetic processing device and a control device and generally controls operations in the information processing system 10 in accordance with various programs. For example, the control unit 50 generates information output from the output unit 30 based on information input by the input unit 20.

The recognition unit 51 has a function of recognizing a real object which is a real object near the information processing system 10. For example, the recognition unit 51 recognizes a shape or a motion of the hand HA, a relative position of each part of the hand HA, or an object put on the top surface 40A of the table 40 based on image information and depth information input by the input unit 20. The recognition unit 51 may recognize a nearby device such as a wristwatch worn by the user, or a smartphone gripped by the user based on the image information and depth information input by the input unit 20.

The storage control unit 52 has a function of accessing the storage unit 60 and acquiring or storing information. The storage control unit 52 according to the embodiment has a retrieving function. For example, the storage control unit 52 acquires retrieved information by reading information that matches the input information such as a character, a number, or a picture corresponding to a motion of the hand HA recognized by the recognition unit 51 from the storage unit 60. Then, the retrieved information is output to the display control unit 53.

The display control unit 53 generates various pieces of display data, and projects and displays information corresponding to the display data on the top surface 40A of the table 40 by supplying generated display data to the output unit 30. For example, input information such as a character or a number based on a motion of the hand is recognized by the recognition unit 51. The display control unit 53 generates display data corresponding to the input information based on a recognition result. When the display data is output from the display control unit 53 to the output unit 30 and the display data is projected and displayed from the output unit 30, the input information is projected to a predetermined portion of the top surface 40A. The display control unit 53 generates the display data corresponding to the retrieved information retrieved by the storage control unit 52. When the display data is output from the display control unit 53 to the output unit 30 and the display data is projected and displayed from the output unit 30, the retrieved information is projected to a predetermined portion of the top surface 40A.

When a window is set based on a recognition result (a sensing result) of an operator such as the hand HA recognized by the recognition unit 51 and an input start performed using the operator is detected, the display control unit 53 displays the starting point of the input start within the window. The details of the window or the like will be described below.

(Storage Unit)

The storage unit 60 records and reproduces data on a storage medium. Examples of the storage medium include a magnetic storage device such as a hard disk drive (HDD), a semiconductor storage device, an optical storage device, and a magneto-optical storage device.

One kind of information processing system 10 has been described above. The information processing system 10 illustrated in FIG. 3 may be configured as a single device or some or all of the information processing system 10 may be configured as separate devices. For example, in the functional configuration example of the information processing system 10 illustrated in FIG. 3, the control unit 50 may be included in a device such as a server connected to the input unit 20 and the output unit 30 via a network. When the control unit 50 is included in a device such as a server, information from the input unit 20 is transmitted to the device such as a server via a network or the like, the control unit 50 performs a process on the information from the input unit 20, and information to be output by the output unit 30 is transmitted from the device such as a server to the output unit 30 via the network or the like.

Specific Operation Example in Information Processing System

Figure 4:
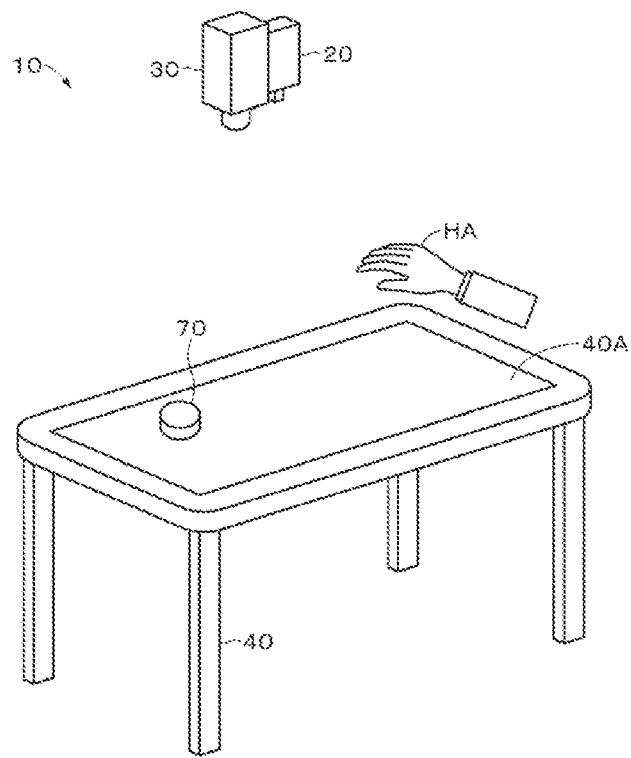
FIG. 4 is a diagram that will be referred to when a specific operation example in the information processing system according to the first embodiment is described.

Next, a specific operation example in the information processing system will be described. FIG. 4 is a diagram illustrating a specific configuration example of the information processing system 10 according to the first embodiment. As described above, the information processing system 10 includes the input unit 20 and the output unit 30. For example, an article 70 which has a cylindrical shape and is a small real object is put on the top surface 40A of the table 40. The article 70 may be any article, and the shape of the article and number of articles are arbitrary. The hand HA of the user is caused to hover above the top surface 40A. The hand HA is a part including a part from a wrist to fingertips. The user performs various inputs using the hand HA. Specifically, the user performs an operation of drawing any input information (in this example, a character) with the index finger of the hand HA in a space above the top surface 40A. In this example, the number of users is one in the description. As will be described below, a plurality of users may use the information processing system 10.

As illustrated in FIG. 4, when the hand HA is hovering above the top surface 40A, the recognition unit 51 recognizes the hand HA. The recognition unit 51 recognizes (detects) a posture (shape) of the hand HA based on depth information obtained via the input unit 20. For example, as illustrated in FIG. 4, when the posture of the hand HA recognized by the recognition unit 51 is opening of the palm of the hand, the control unit 50 sets an own operation mode as a gesture recognition mode.

Figure 5:
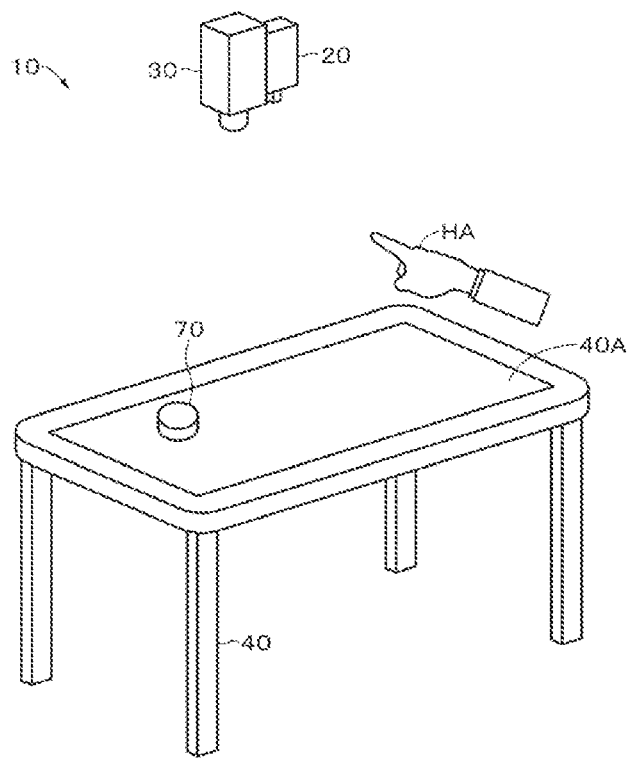
FIG. 5 is a diagram that will be referred to when a specific operation example of the information processing system according to the first embodiment is described.

Next, as illustrated in FIG. 5, the user takes a posture of stretching only the index finger for hold as the posture of the hand HA. The recognition unit 51 recognizes the posture of the hand HA based on depth information obtained by the input unit 20. As a result of the recognition by the recognition unit 51, the control unit 50 performs transition from the own operation mode to a character input mode.

When the operation mode transitions to the character input mode, the display control unit 53 sets a window. The window is set within a projectable region which is a region in which projection and display are possible. The projectable region is determined based on at least the position of the hand HA. That is, when the position of the hand HA is known, a relative positional relation between the position of the hand HA and the output unit 30 can be determined. Therefore, it is possible to roughly determine a portion or size of a region shielded by the hand HA, that is, a shade region. The projectable region is set to avoid the shade region. The projectable region may include a region which is not visually shielded by the hand HA. For example, a region to be visually shielded may be learned and stored in advance from an object which is recognized as an operator and a position of the operator, and a region that is visually shielded may be actually determined in accordance with the operator used in the information processing system 10 and a position of the operator. The projectable region may be a region including a region in which a real object put on a plane including the projectable region is avoided.

Figure 6:
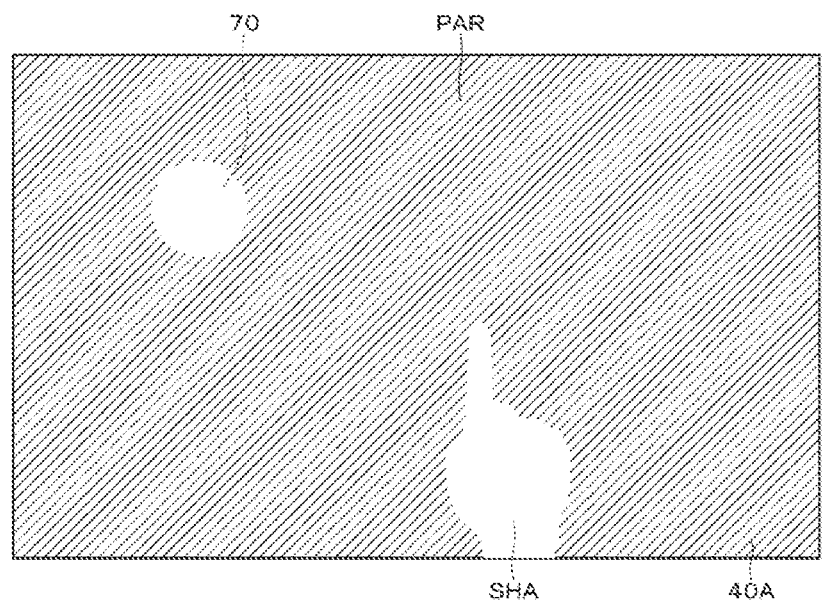
FIG. 6 is a diagram schematically illustrating a projectable region according to the first embodiment.

FIG. 6 schematically illustrates a projectable region PAR (a portion indicated by diagonal lines). In the embodiment, this region is a display region which can be projected within the top surface 40A, and a region in which the positions of the article 70 and the shade region SHA of the hand HA are avoided is set as the projectable region PAR. The shade region SHA may not necessarily match the shape, size, or the like of the hand HA precisely, may be a region formed by appropriately expanding the shape or the like of the hand HA or may be a region specified by applying a known method.

Figure 7:
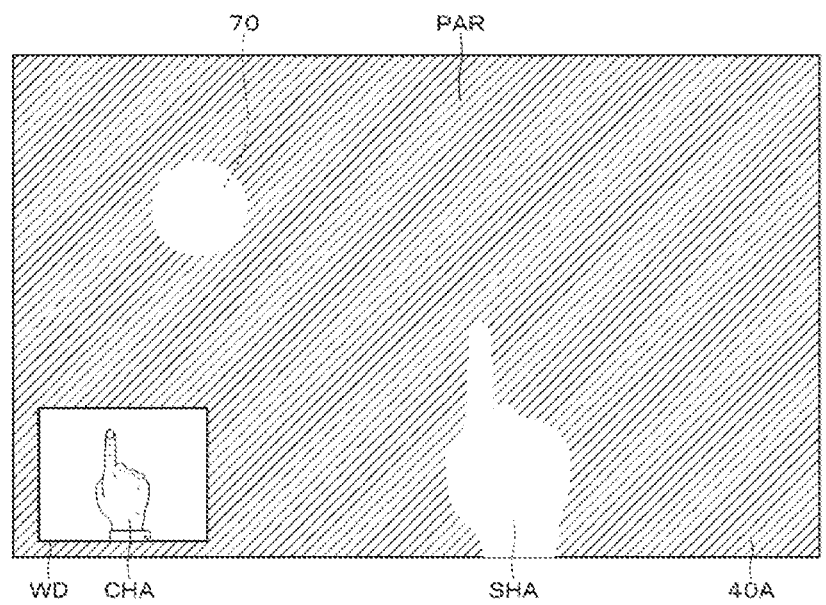
FIG. 7 is a diagram illustrating an example of a window set in the projectable region.

A window is set within the projectable region PAR. FIG. 7 illustrates a window WD set near the lower left corner within the projectable region PAR. In the embodiment, the projectable region PAR and the window WD are set on substantially the same plane. Substantially the same plane includes at least one of a plane seen as the same plane when the plane is seen in any direction on the same plane (for example, in a top view) (there is a level difference when the plane is seen from the side) and a plane on which projected and displayed content can be confirmed (slight unevenness is allowed).

As illustrated in FIG. 7, the window WD is, for example, a region surrounded by a rectangular frame. An appropriate shape such as a circle or a triangle can be selected as the shape of the window WD. A default predetermined size is defined in advance as the size of the window WD. In the embodiment, the window WD is displayed under the control of the display control unit 53. Examples of a display aspect of the window WD include an aspect in which only an outer edge (frame) is projected and displayed and an aspect in which the region of the window WD is colored and is projected and displayed. The window WD may not necessarily be displayed. However, when the window WD is displayed, a user can easily recognize where input information is displayed.

FIG. 7 illustrates an example in which the window WD is set near the lower left corner within the projectable region PAR, but the present disclosure is not limited thereto. A setting position of the window WD within the projectable region PAR is determined based on a process to be described below, for example. The process to be described below is performed by, for example, the display control unit 53.

As one method, within the projectable region PAR, positions into which the window WD fits are determined at random and the window WD is set at any of the determined positions.

Another method will be described. Based on the depth information, the recognition unit 51 recognizes on which side an arm including the hand HA is located among four sides of the table 40. The window WD is set within the projectable region PAR near the side on which the arm is located. Thus, since a distance between the user who has raised his or her arm and the window WD can be shorter, it is easy for the user to see information projected and displayed in the window WD.

Still another method will be described. The top surface 40A of the table 40 is evenly divided into four regions (for example, cross-shaped regions) and an area of a projectable region in each region is obtained. The window WD is set at a position close to a corner of a region with the largest projectable area. Thus, a change in the position of the window WD due to a later movement of the hand HA can be caused to occur as little as possible.

Still another method will be described. The window WD is disposed on the left side of the position of a hand used to perform an input. Thus, even when the hand HA is operated in a direction in which a character is input (for example, on the right side) after a character input start, a change in the position of the window WD can be caused to occur as little as possible. When a character is input in the vertical direction, the window WD is disposed on the upper side of the position of a hand used to input the character. Thus, even when the hand HA is operated in a direction in which the character is input (for example, on the lower side), a change in the position of the window WD can be caused to occur as little as possible. Still another method will be described. For example, a motion of the hand HA may be predicted from the position of a hand in several previous frames and the window WD may be disposed avoiding a position that the hand HA will faces later. The window WD is disposed at a portion at which the hand HA facing direction is avoided. Therefore, a change in the position of the window WD can be caused to occur as little as possible even when the hand HA is operated in a character inputting direction.

Figure 8:
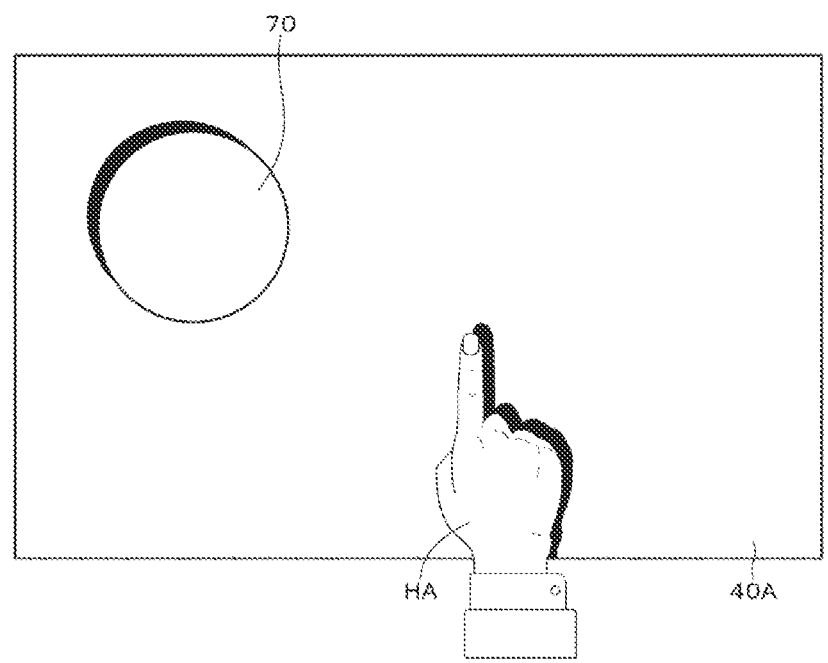
FIG. 8 is a diagram that will be referred to when a process of giving a notification on expanding a projectable region is described.

In a case in which the position of the window WD cannot be set even when any of the above-described methods is applied, another method may be applied. When there is room for the size of the projectable region PAR, the size of the window WD which is defined as a default may be increased. Conversely, when the window WD with the size defined as the default cannot be set, the size of the window WD may be decreased. A predetermined notification may be performed without decreasing the size of the window WD. The predetermined notification is performed via the output unit 30 under the control of the control unit 50. The predetermined notification is a notification on expanding the projectable region PAR. A specific example of the content of the notification is content for allowing the user to move a real object on the top surface 40A or move the position of the hand HA. As illustrated in FIG. 8, when the article 70 is large, a notification prompting the article 70 to be removed from the top surface 40A is performed. When the article 70 is removed, the projectable region PAR can be expanded. When the position of the hand HA in the height direction is high and is far from the top surface 40A, a notification on prompting the user to lower the position of the hand HA is performed. When the hand HA becomes closes to the top surface 40A, the shade region SHA becomes small and the projectable region PAR can be expanded.

Figure 9:
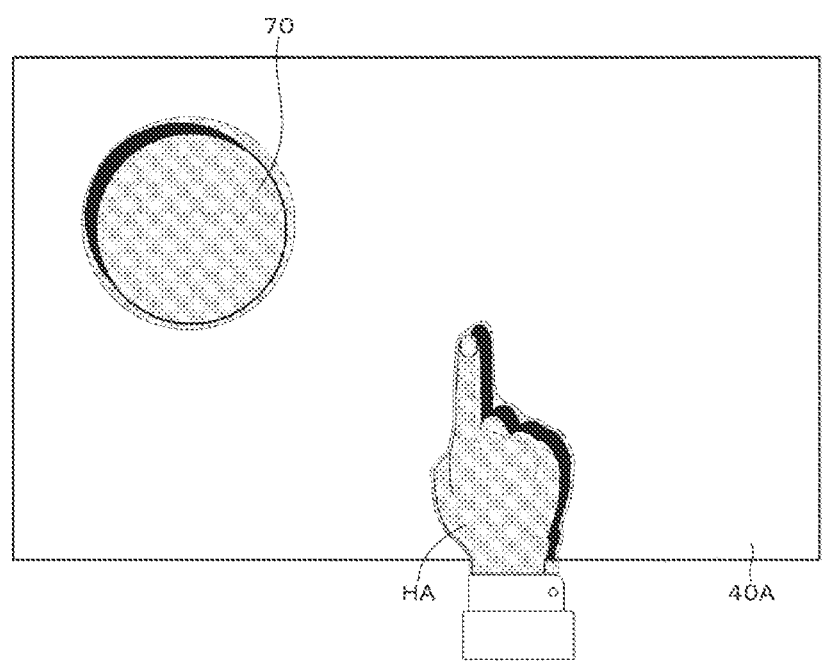
FIG. 9 is a diagram that will be referred to when a process of giving a notification on expanding the projectable region is described.

The above-described notification can be performed by configuring the output unit 30 that includes a speaker and reproducing a sound from the speaker. The present disclosure is not limited to the sound and a notification may be performed through projection and display. For example, as shown by portions indicated by hatching of FIG. 9, portions (the hand HA and the article 70 in the illustrated example) which cause the projectable region PAR to be narrowed may be colored with a predetermined color (for example, red) for projection and display.

Figure 10:
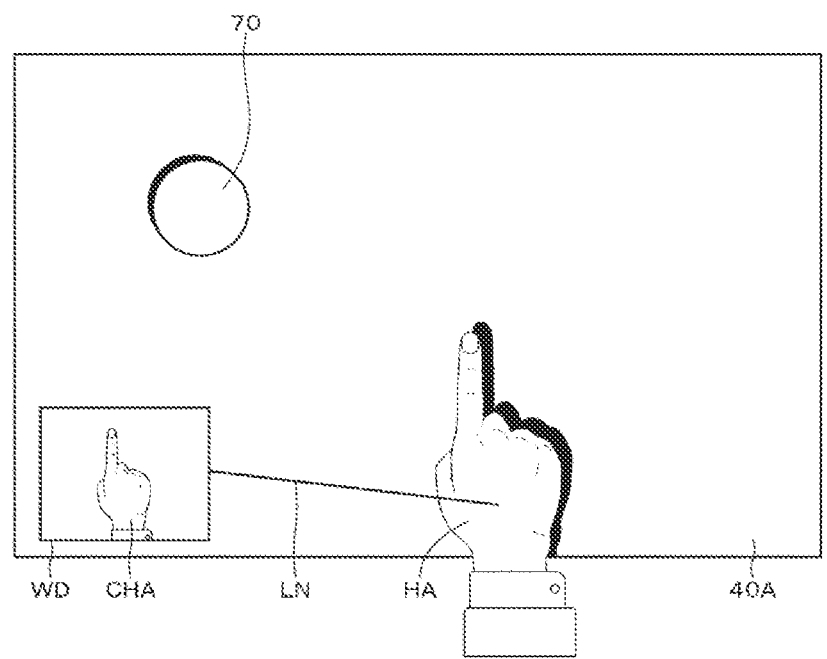
FIG. 10 is a diagram illustrating an example of information for associating an operator with a window.
Figure 11:
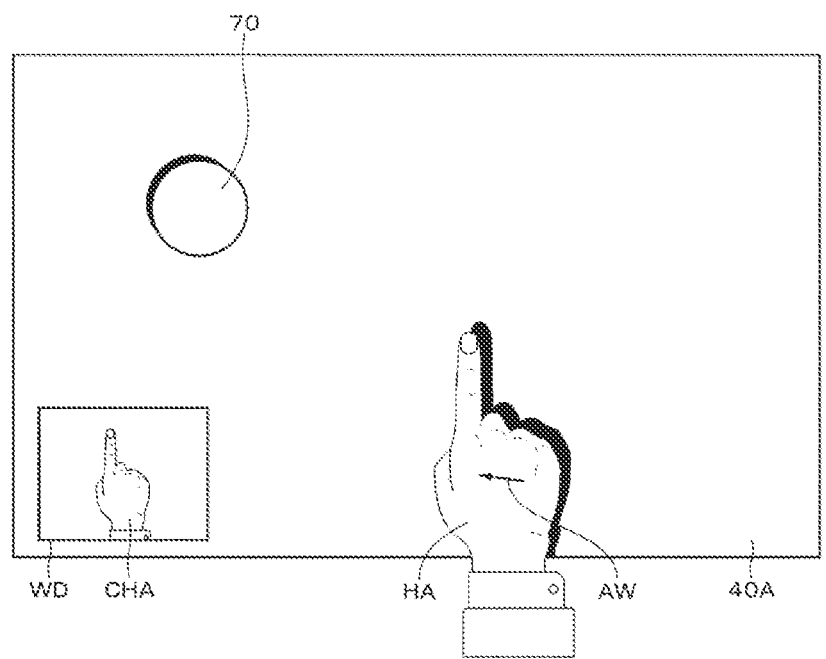
FIG. 11 is a diagram illustrating an example of information for associating the operator with the window.

Information for associating the hand HA with the window WD may be projected and displayed so that the user can easily ascertain the position of the window WD. For example, as illustrated in FIG. 10, a line LN formed from the vicinity of the back of the hand HA to the window WD may be projected and displayed. As illustrated in FIG. 11, an arrow AW indicating the window WD may be projected and displayed in the vicinity of the back of the hand HA.

Within the window WD, a CG hand CHA (an example of a virtual operator) resembling the hand HA is projected and displayed by the output unit 30. Since the window WD is set within the projectable region PAR, the user can recognize information projected and displayed within the window WD and the hand CHA. A motion of the hand CHA is linked with an actual motion of the hand HA. An initial position of the hand CHA is disposed on the left side within the window WD so that it is easy to input a character. When the hand HA protrudes from the window WD in this state, the position of the hand HA is caused to fit within the window WD. The shape, size, or the like of the hand CHA may be projected and displayed to be more appropriate for the shape or the like of the hand HA obtained from the depth information (for example, distinction between a hand of an adult and a hand of a child).

Subsequently, based on a recognition result of the recognition unit 51, the display control unit 53 detects the start of the character input by the hand HA. For example, when a posture of lowering the index finger toward the top surface 40A is recognized, the start of the character input is detected. More specifically, when a difference between the distance from the top surface 40A to the back of the hand HA and the distance from the top surface 40A to the fingertip of the hand HA is greater than a predetermined threshold, the start of the character input is detected. The reason for using the distance from the top surface 40A of the table 40 is that there is concern of the start of the character input not being accurately detectable due to a distance difference on an optical axis when the input unit 20 (for example, a camera) is obliquely provided.

Figure 12:
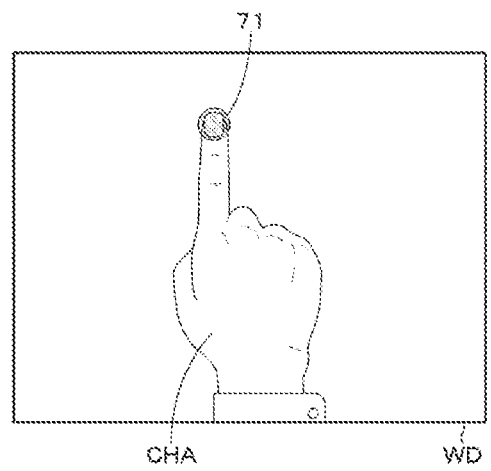
FIG. 12 is a diagram illustrating an example of a starting point of an input start.

When the start of the character input is detected, the display control unit 53 displays a starting point of the input start within the window WD. In this example, the hand HA, specifically, a fingertip of the hand HA, is used to perform the input. Accordingly, as illustrated in FIG. 12, a colored portion 71 in which a fingertip of the hand CHA within the window WD is colored red or the like is projected and displayed as an example of the starting point of the input start. Thus, the user can recognize that the start of the character input is recognized on the device side and the input can be accepted. The user may be notified that the start of the character input is recognized by the device side, for example, by projecting a marker or the like indicating a present state on the back of the hand CHA in addition to the projection and display of the colored portion 71. A point with the same color as the colored portion 71 may also be projected and displayed at the actual fingertip of the hand HA.

Figure 13A:
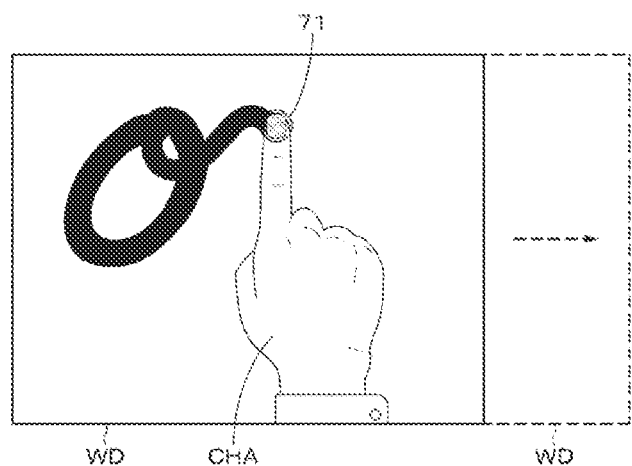
FIGS. 13A and 13B are diagrams illustrating a process of expanding a window when a CG hand does not fit into the window.

The user recognizing that the colored portion 71 is projected and displayed at the fingertip of the hand CHA moves his or her own hand HA in the space to draw a character, specifically, a curve corresponding to the character, which is an example of the input information. An operation of drawing the character, in other words, a trajectory of the character, is recognized in real time by the recognition unit 51 and display data corresponding to this trajectory is generated by the display control unit 53. The generated display data is output by the output unit 30 and, as illustrated in FIG. 13A, a character (in the illustrated example, "O") drawn by the hand HA of the user is displayed within the window WD.

Figure 13B:
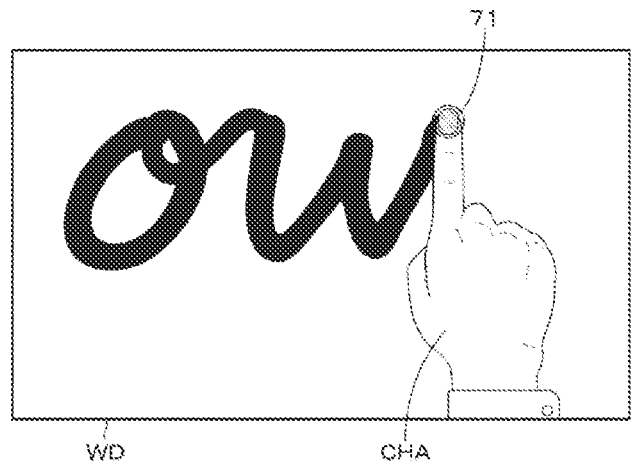

When an operation of writing a character is performed by the hand HA, the hand HA is generally operated from the left side to the right side from the viewpoint of the user. In connection with this motion, the hand CHA within the window WD is projected and displayed so that the hand CHA is moved from the left side to the right side. Therefore, there is concern of the hand CHA moved toward the right side not fitting within the window WD. Accordingly, the display control unit 53 may change the size of the window WD based on a relation between the window WD and the position of the hand CHA and may project and display the window WD with the changed size. For example, when a distance between the center of the back of the hand CHA and the right end of the window WD is equal to or less than a threshold, as illustrated in FIG. 13A, the window WD may be expanded to the right side. In the expansion of the size of the window WD, it may be expanded all at once or may be gradually expanded. Since the size of the window WD is updated to an appropriate size, as illustrated in FIG. 13B, the hand CHA and a character string (in the illustrated example, "OW") drawn by the user can be projected and displayed within the window WD.

There is concern of the size of the window WD not being expandable or the window WD being shielded by the moved hand HA because the position of the hand HA is moved. Accordingly, the display control unit 53 may reset (re-dispose) the window WD based on a relation between the position of the hand HA and the position of the window WD.

Figure 14A:
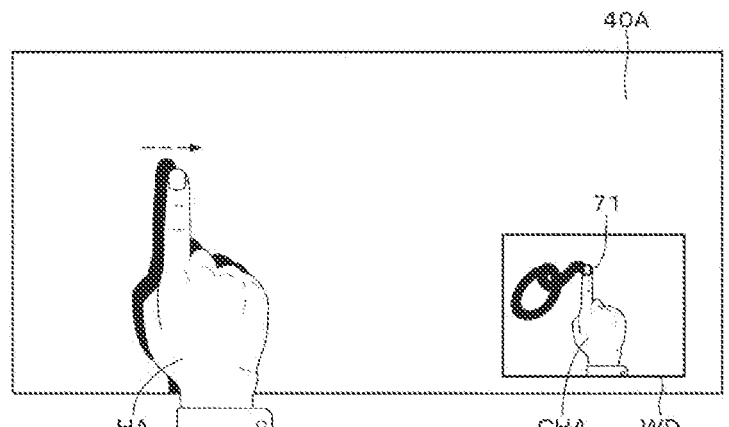
FIGS. 14A, 14B, and 14C are diagrams that will be referred to when an example of a process of resetting the window is described.
Figure 14B:
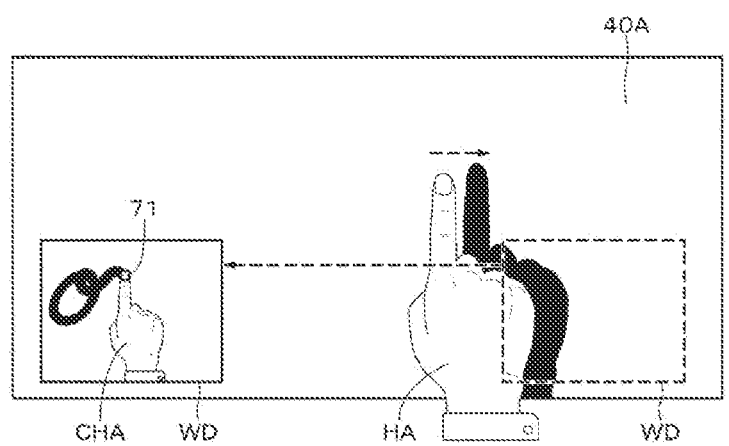
Figure 14C:
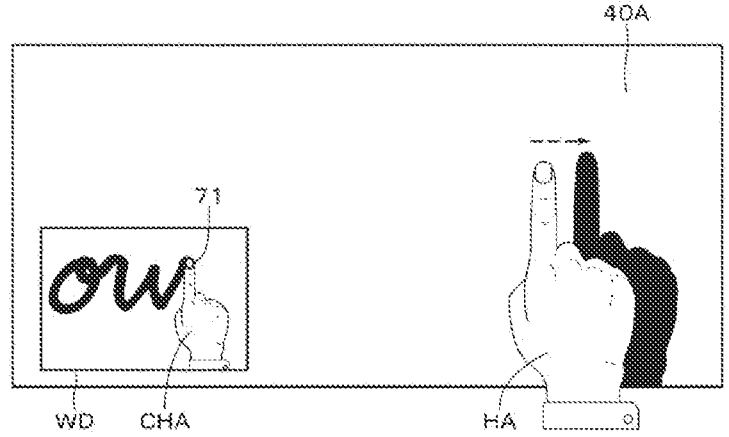

A process of resetting the window WD is performed as follows, for example. As illustrated in FIG. 14A, the user moves the hand HA from the left side to the right side while drawing the characters with his or her fingertip. The window WD is assumed to be set near the lower right corner of the top surface 40A. For example, as illustrated in FIG. 14B, when an area of a region in which the region of the hand HA overlaps the region of the window WD exceeds a threshold, the window WD is reset. As a method of resetting the window WD, any of the above-described methods of setting the window WD can be applied. Then, the window WD is projected and displayed at the reset position (near the lower left corner of the top surface 40A in the example illustrated in FIG. 14B). By performing this process, the user recognizes an aspect in which the window WD is as if being moved from the right side to the left side. The window WD may be moved instantaneously or may be moved from the movement source to a movement destination using a predetermined animation. During the character input mode, to avoid the movement of the window WD, the window WD and the hand CHA or the character within the window WD may be contracted so that the hand CHA or the character fits into a region within the window WD. By performing the foregoing processes, as illustrated in FIG. 14C, it is possible to prevent the window WD from being shielded by the moved hand HA. Accordingly, the user can recognize the character or the like projected and displayed within the window WD. In FIGS. 14A, 14B, and 14C, the size or the like of the top surface 40A is appropriately contracted because of the illustrated space.

When a difference between the distance from the top surface 40A to the back of the hand HA and the distance from the top surface 40A to the fingertip is less than the predetermined threshold, the control unit 50 determines that the character input ends. As described above, when the window WD is expanded and a region necessary for the expansion disappears, it may be determined that the character input ends. When it is detected that the character input ends, the character input mode is released. When the character input mode is released, the process of projecting and displaying the curve based on the motion of the hand HA within the window WD is not performed even if the hand HA moves. The projection and display of the hand CHA and the colored portion 71 within the window WD are stopped. By repeating the above-described processes, a plurality of curves are projected and displayed within the window WD so that the character string is projected and displayed within the window WD.

Figure 15:
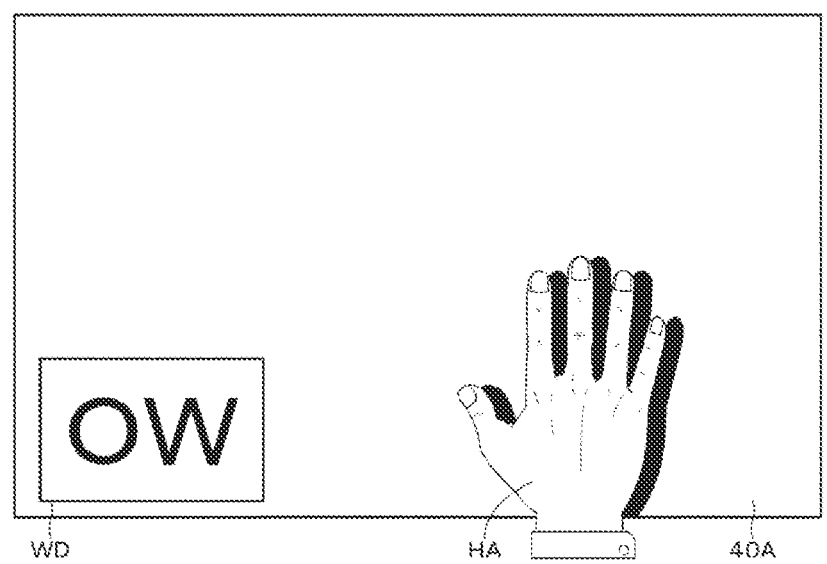
FIG. 15 is a diagram illustrating an example in which retrieved information is displayed within the window.

When the user stops a posture of stretching only the index finger and holding the hand HA and performs, for example, a posture of opening the palm of the hand, a character matching a curve drawn at that time is retrieved by the storage control unit 52. Data related to characters is stored in, for example, the storage unit 60. Retrieved information (in this example, the character) retrieved by the storage control unit 52 is handled as an input value and the input value is used for a purpose in accordance with an application. When a character matching the input curve is not retrieved, the input value may be considered to be "none" or a notification indicating an error may be performed. Display data corresponding to the retrieved information may be generated by the display control unit 53. Then, the display data may be projected and displayed via the output unit 30. For example, as illustrated in FIG. 15, the retrieved characters "OW" may be projected and displayed within the window WD. After the characters "OW" are projected and display for several seconds, the window WD and the characters or the like within the window WD are erased. It is not necessary to retrieve a character matching the input curves. The input information such as characters, a picture, or the like projected and displayed within the window WD may be automatically stored in a memory or may be printed by a printer.

Flow of Process

Next, an example of a flow of a process performed in the information processing system 10 according to the first embodiment will be described with reference to the flow-charts of FIGS. 16 to 20. The control unit 50 performs the following process to be described unless otherwise mentioned.

Entire Flow of Process

Figure 16:
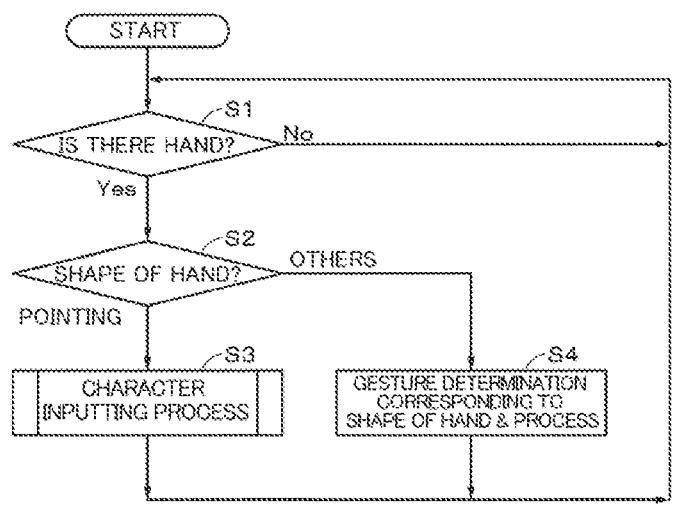
FIG. 16 is a flowchart illustrating an example of a flow of a process (an entire flow of a process) performed in the information processing system according to the first embodiment.

FIG. 16 is a flowchart illustrating an example of an entire flow of a process. In step S1, based on a recognition result of the recognition unit 51, it is determined whether there is the hand HA within a region which can be sensed by the recognition unit 51. When there is no hand HA, the determination process of step S1 is repeated. When there is the hand HA, the process proceeds to step S2.

In step S2, the shape of the hand HA recognized by the recognition unit 51 is determined. When the shape of the hand HA is a shape of stretching only the index finger (hereinafter this shape is also referred to a shape of performing pointing in some cases), the process proceeds to step S3. In step S3, a character inputting process is performed. When the shape of the hand HA is a shape other than the shape of performing the pointing, the process proceeds to step S4. In step S4, a gesture determination corresponding to the shape of the hand and a process based on a determination result are performed. When the shape of the hand HA is a shape other than the shape of performing the pointing, the process such as the gesture determination may not be particularly performed and the determination process of step S2 may be repeated.

Flow of Character Inputting Process

Figure 17:
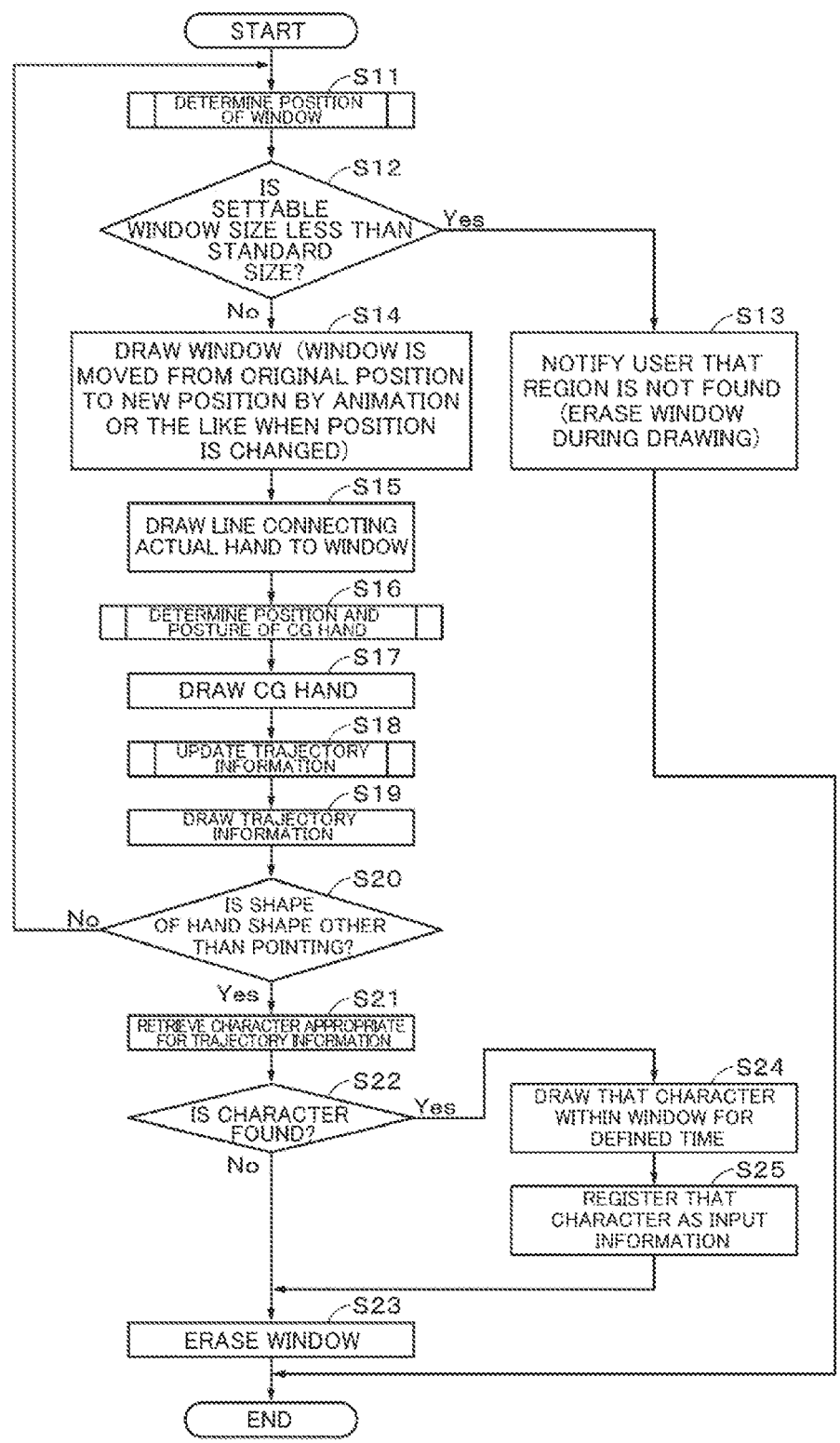
FIG. 17 is a flowchart illustrating an example of a flow of a process (a flow of a character inputting process) performed in the information processing system according to the first embodiment.

FIG. 17 is a flowchart illustrating an example of a flow of the character inputting process. In step S11, a process of determining a position of the window WD is performed. Then, the process proceeds to step S12.

In step S12, it is determined whether the size of the window WD of which the position is determined in the process of step S11 is less than a standard size. The standard size is appropriately set based on the size of the top surface 40A of the table 40, a size necessary to project and display the input information and the CG hand CHA within the window WD, or the like. Here, when the settable size of the window WD in the projectable region PAR is less than the standard size, the process proceeds to step S13.

In step S13, the user is notified that a region in which the window WD can be set is not found, and then the process ends. This notification is not limited to the projection and display, but may be any of display of a sound or vibration on a display unit, a combination thereof, and the like. When the window WD is being drawn, the window WD is erased.

When the size of the window WD which can be set in the projectable region PAR is not less than the standard size, the process proceeds to step S14. In step S14, the window WD is drawn at the set position. When the position of the window WD is reset, the window WD is moved by an animation or the like from the original position to a new position. Then, the process proceeds to step S15.

In step S15, a line connecting the actual hand HA to the window WD which is being drawn is drawn. Then, the process proceeds to step S16.

In step S16, a position and posture of the CG hand CHA drawn inside the window WD which is being drawn are determined. Then, the process proceeds to step S17.

In step S17, the hand CHA at which the position and posture determined in step S16 is drawn inside the window WD. Then, the process proceeds to step S18.

In step S18, a process of updating trajectory information is performed. Then, the process proceeds to step S19.

In step S19, the updated trajectory information is drawn as input information within the window WD. Then, the process proceeds to step S20.

In step S20, it is determined whether the shape of the hand HA is a shape other than pointing. When the shape of the hand HA is pointing, the process returns to step S11. The process may return to step S18 rather than S11 to update the trajectory information. When the shape of the hand HA is a shape other than pointing, the process proceeds to step S21.

In step S21, a character appropriate for the trajectory information is retrieved. For example, information stored in the storage unit 60 is retrieved as target information. Then, the process proceeds to step S22.

In step S22, it is determined whether the character appropriate for the trajectory information is retrieved. Here, when the character appropriate for the trajectory information is not retrieved (the character is not found), the process proceeds to step S23.

In step S23, the window WD which is being drawn is erased. Then, the process ends.

When the character appropriate for the trajectory information is retrieved in the determination process of step S22, the process proceeds to step S24.

In step S24, the retrieved character (which is an example of the retrieved information) is drawn within the window WD for a defined time (for example, about several seconds to 1 minute). Then, the process proceeds to step S25.

In step S25, the retrieved character is registered (stored) as an input. A process in accordance with the retrieved character may be performed.

Flow of Process of Determining Position of Window

Figure 18:
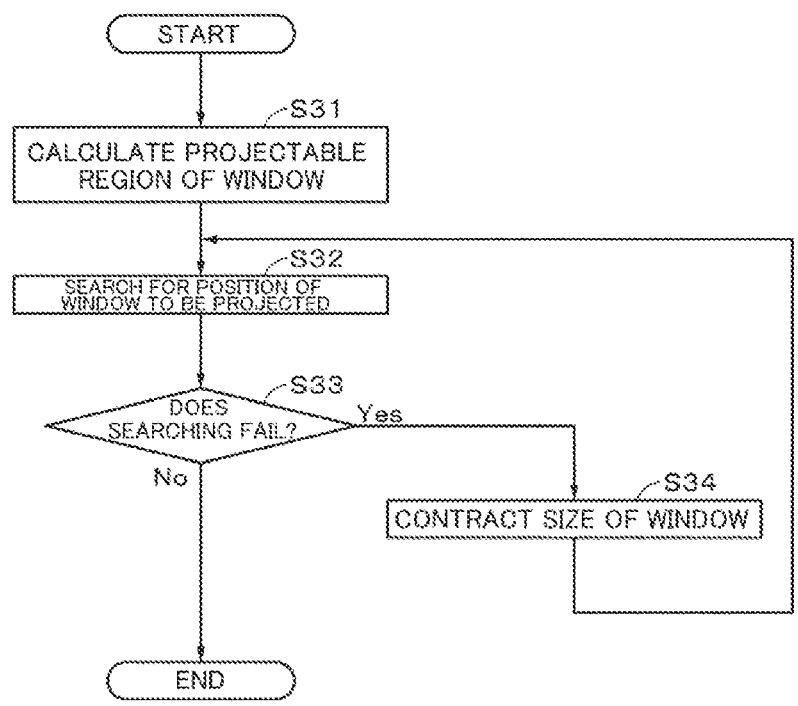
FIG. 18 is a flowchart illustrating an example of a flow of a process (a flow of a process of determining a position of a window) performed in the information processing system according to the first embodiment.

FIG. 18 is a flowchart illustrating an example of a flow of a process of determining a position of the window in step S11 described above. In step S31, the projectable region PAR in which the wind WD can be set is calculated. Then, the process proceeds to step S32.

In step S32, a position at which the window WD to be projected and displayed is to be disposed is searched for within the projectable region PAR. In the first process, the size of the window WD is set to a predetermined size as a default size. A specific example of the method of determining the position at which the window WD is disposed has been described above. Then, the process proceeds to step S33.

In step S33, it is determined whether the searching of the position at which the window WD is disposed fails. That is, it is determined whether the window WD with the predetermined size can be disposed at a predetermined portion within the projectable region PAR. When the searching of the position at which the window WD is disposed fails, the process proceeds to step S34.

In step S34, the size of the window WD is contracted. The degree of contraction can be appropriately set. Then, the process returns to step S32 and the position of the window WD with the contracted size is searched for again. When the determination process of step S33 is Yes, a notification may be performed to expand the projectable region PAR. Moreover, the position of the window WD with the original size may be searched for again without contracting the size of the window WD.

When the searching of the position at which the window WD is disposed does not fail but succeeds, the process ends. As described above, subsequently, it is determined whether the size of the window WD of which the position is successfully searched for is less than the defined size (the process of step S12).

Flow of Process of Determining Position and Posture of CG Hand

Figure 19:
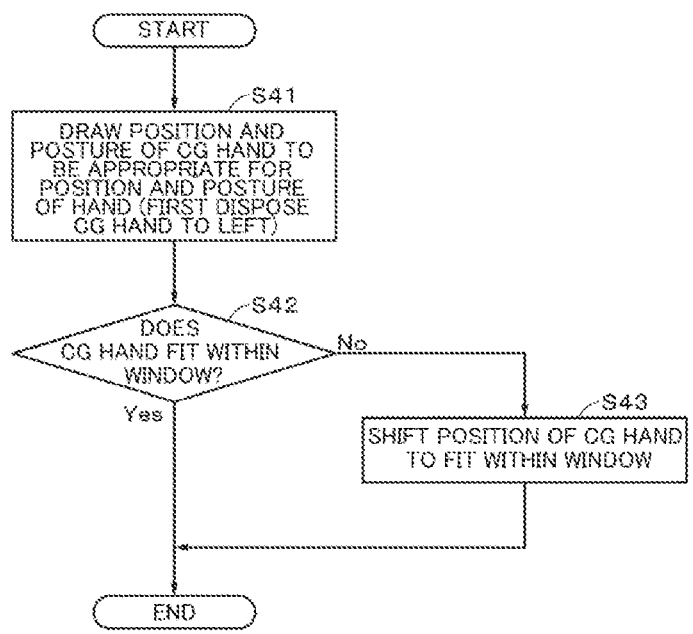
FIG. 19 is a flowchart illustrating an example of a flow of a process (a process of determining a position and a posture of the CG hand) performed in the information processing system according to the first embodiment.

FIG. 19 is a flowchart illustrating an example of a process of determining a position and posture of the CG hand of step S16 described above. In step S41, a process of updating and drawing the position and posture of the CG hand CHA to be appropriate for the position and posture of the actual hand HA is performed. In the first process, for example, the hand CHA is drawn close to the left within the window WD. The position and posture of the CG hand CHA are updated to link to a change in the position and posture of the hand HA, the hand CHA at the updated position and posture is drawn within the window WD. Then, the process proceeds to step S42.

In step S42, it is determined whether the CG hand CHA fits within the window WD. When the CG hand CHA fits within the window WD, the process ends. When the CG hand CHA does not fit within the window WD, the process proceeds to step S43.

In step S43, the position of the hand CHA is shifted (moved) so that the CG hand CHA fits within the window WD. The size of the hand CHA may be changed. Then, the process ends.

Flow of Process of Updating Trajectory Information

Figure 20:
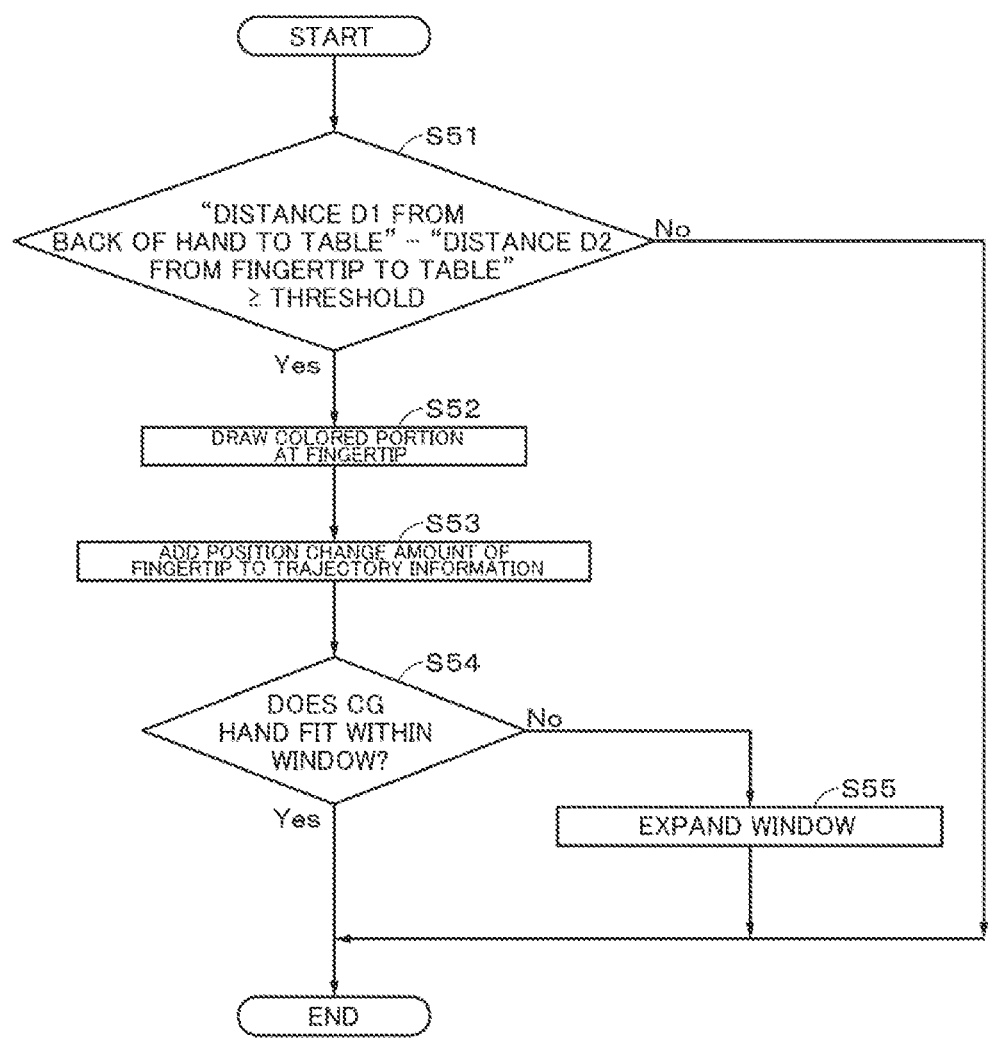
FIG. 20 is a flowchart illustrating an example of a flow of a process (a process of updating trajectory information) performed in the information processing system according to the first embodiment.

FIG. 20 is a flowchart illustrating an example of a flow of a process of updating the trajectory information of step S18 described above. In step S51, it is determined whether a difference (D1-D2) between a distance D1 from the back of the hand HA to the top surface 40A of the table 40 and a distance D2 from a fingertip of the hand HA to the top surface 40A of the table 40 is equal to or greater than the threshold. When the difference (D1-D2) is less than the threshold, the process ends. When the difference (D1-D2) is equal to or greater than the threshold, the process proceeds to step S52.

In step S52, the colored portion 71 is drawn at the fingertip (which is an example of the starting point of the input start) of the hand CHA within the window WD. Then, the process proceeds to step S53.

In step S53, a position change amount of the fingertip is added as trajectory information. The position change amount of the fingertip is detected, for example, at every frame or every predetermined number of frames. The trajectory information is drawn within the window WD through the process of step S19. Then, the process proceeds to step S54.

The position of the hand HA is changed with the input and the position of the CG hand CHA is also changed with the change. Accordingly, in step S54, it is determined whether the hand CHA fits within the window WD. When the hand CHA does not fit within the window WD, the process proceeds to step S55 and a process of expanding the window WD is performed. Then, the process ends.

When the hand CHA fits within the window WD, the process ends. While the difference (D1-D2) is continuously the threshold in the determination process of step S51, the colored portion 71 is continuously drawn and the position change amount of the fingertip of the hand HA is added as the trajectory information.

According to the above-described first embodiment, the window can be projected and displayed at a position at which the window is not visually shielded by the hand or the like. By projecting and displaying the input information within the window, the user can visually recognize the input information obtained by moving the finger or the like. Since the starting point of the input start is displayed, the user can recognize that the information processing system accepts the input performed by the own finger or the like and the user can easily recall the image input by the user.

Second Embodiment

Next, a second embodiment will be described. The description of the first embodiment can also be applied to the second embodiment unless otherwise mentioned. The same reference numerals are given to the same and homogenous configurations as the above-described configurations and repeated description will be omitted.

The configuration and function of the information processing system 10 can be applied to a configuration and function of an information processing system according to the second embodiment. While a difference between the first and second embodiments is that the information processing system 10 according to the first embodiment is used by a single user, but the information processing system 10 according to the second embodiment is used by a plurality of (for example, two) users.

For example, an example will be considered in which there is one user A who faces one of long sides of the top surface 40A and there is another user B who faces the other of the long sides. The users A and B are, for example, located in a diagonal direction of the top surface 40A. The users A and B may be located to face each other. Each user draws a character, a picture, or the like in a space using his or her finger or the like as in the first embodiment. Input information in accordance with the operation of drawing the character or the like is projected and displayed within the window.

Figure 21:
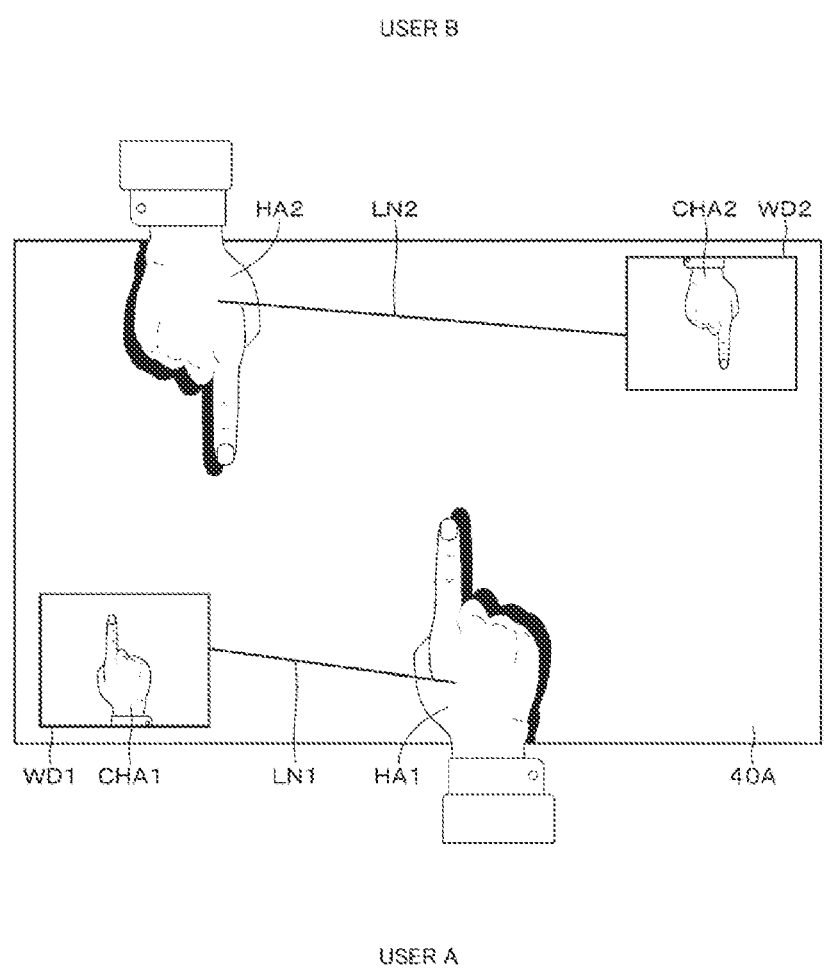
FIG. 21 is a diagram illustrating a projection display example of a window or the like according to a second embodiment.

In the second embodiment, for example, as illustrated in FIG. 21, the window WD corresponding to each user is projected and displayed on the top surface 40A. Specifically, a window WD1 corresponding to the user A is projected and displayed on the left side from the viewpoint of the user A. A window WD2 corresponding to the user B is projected and displayed on the left side from the viewpoint of the user B. The windows WD1 and WD2 are set based on recognition results of a hand HA1 of the user A and a hand HA2 of the user A as in the first embodiment.

Information associating a user with the window of the user is projected and displayed so that it is possible to easily recognize a user of the window to which the projected and displayed window correspond. In the example illustrated in FIG. 21, a line LN1 connecting the hand HA1 to the window WD1 is projected and displayed as information causing the hand HA1 to correspond to the window WD1, and a line LN2 connecting the hand HA2 to the window WD2 is projected and displayed as information causing the hand HA2 to correspond to the window WD2.

Figure 22:
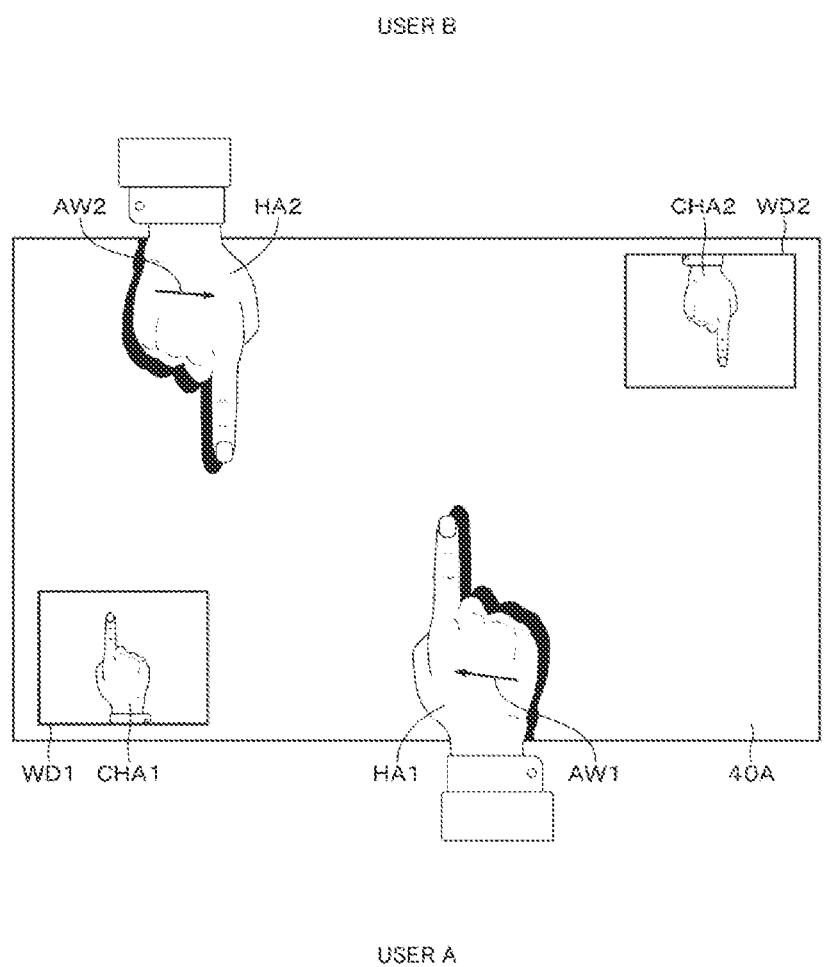
FIG. 22 is a diagram illustrating another projection display example of the window or the like according to the second embodiment.

An arrow indicating a position at which the window corresponding to a user is projected and displayed may be projected and displayed near the back of a hand of the user. As illustrated in FIG. 22, for example, an arrow AW1 indicating the window WD1 may be projected and displayed in a portion near the back of the hand HA1, and an arrow AW2 indicating a direction of the window WD2 may be projected and displayed in a portion near the back of the hand HA2.

Figure 23:
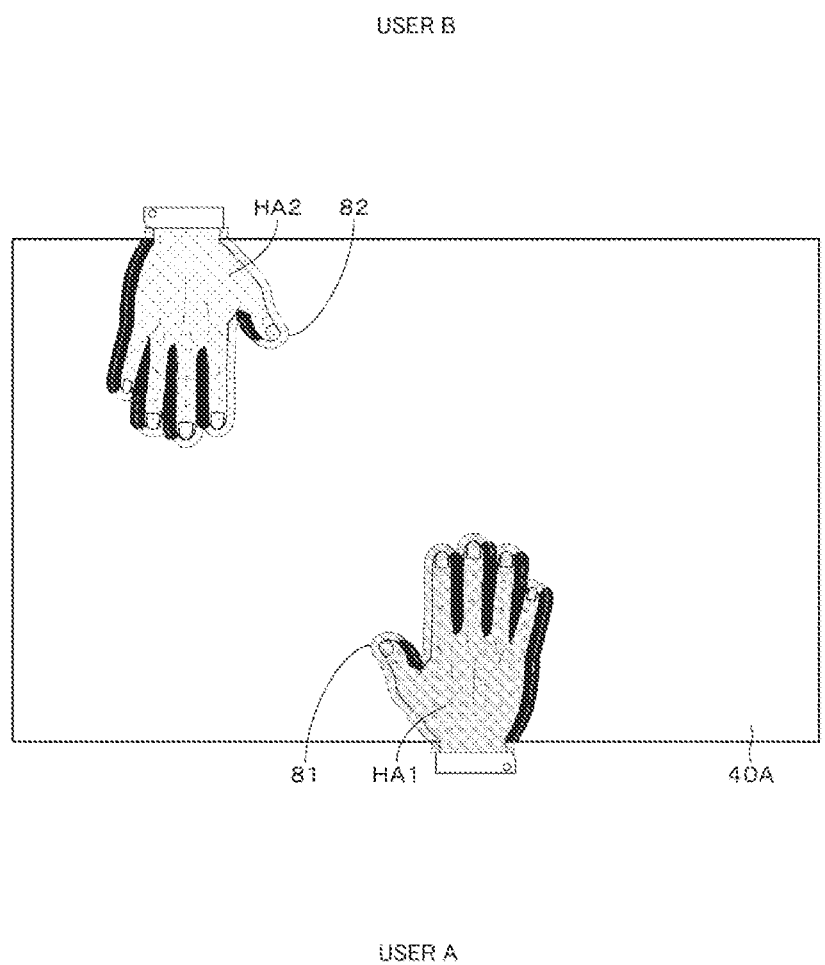
FIG. 23 is a diagram illustrating still another projection display example of the window or the like according to the second embodiment.

A colored portion indicating a hand of a user and a window corresponding to the user with the same color may be projected and displayed. For example, as illustrated in FIG. 23, when the recognition unit 51 recognizes each of the hands HA1 and HA2, colored portions indicating that the respective hands are colored with different colors are projected and displayed. For example, a colored portion 81 of red is projected and displayed for the entire hand HA1 and a colored portion 82 of green is projected and displayed for the entire hand HA2. The colors of the colored portions 81 and 82 can be appropriately set.

Figure 24:
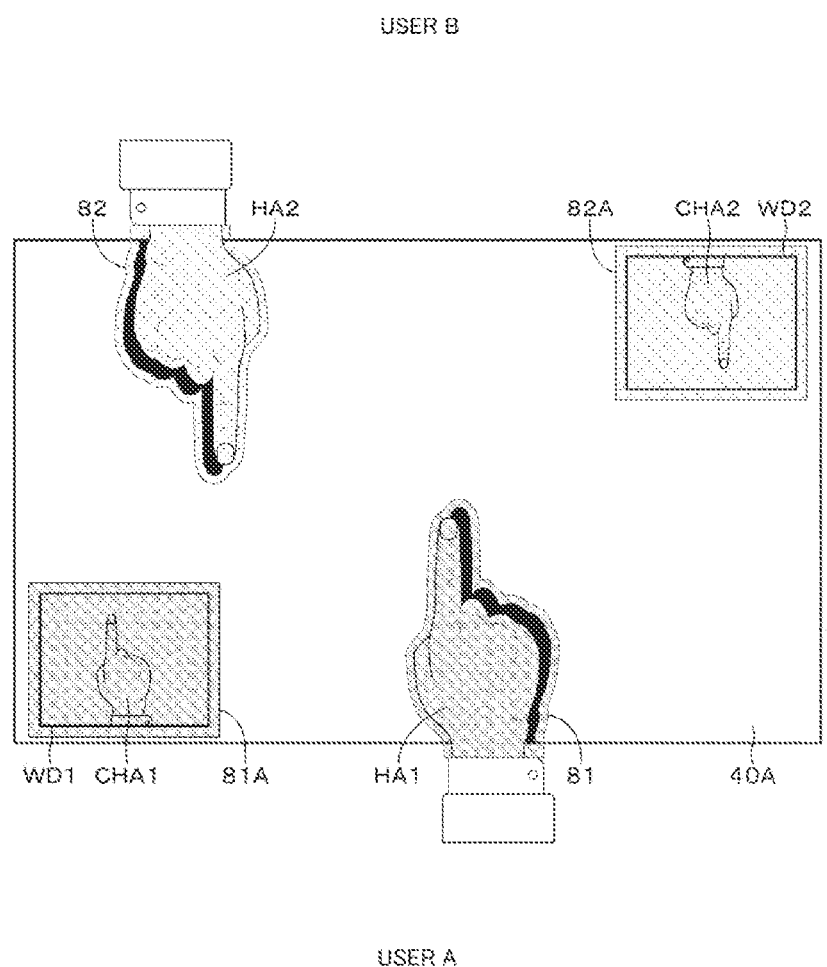
FIG. 24 is a diagram illustrating still another projection display example of the window or the like according to the second embodiment.

As illustrated in FIG. 24, a colored portion 81A with the same color as the colored portion 81 is also projected and displayed in the window WD1 corresponding to the hand HA1. A colored portion 82A with the same color as the colored portion 82 is also projected and displayed in the window WD2 corresponding to the hand HA2. The information associating a user with the window of the user may be information combined with the above-described information or may be another information.

Figure 25A:
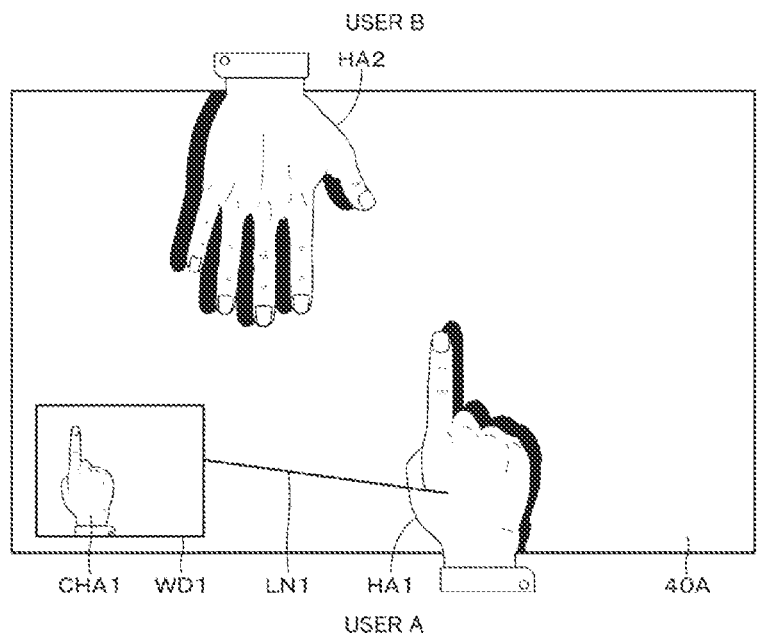
FIGS. 25A and 25B are diagrams illustrating still another projection display example of the window or the like according to the second embodiment.
Figure 25B:
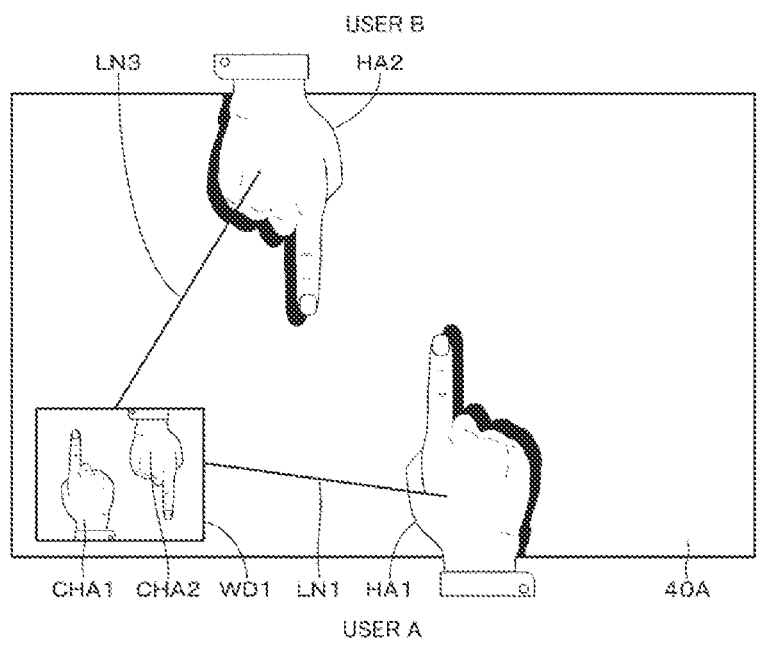
Figure 26:
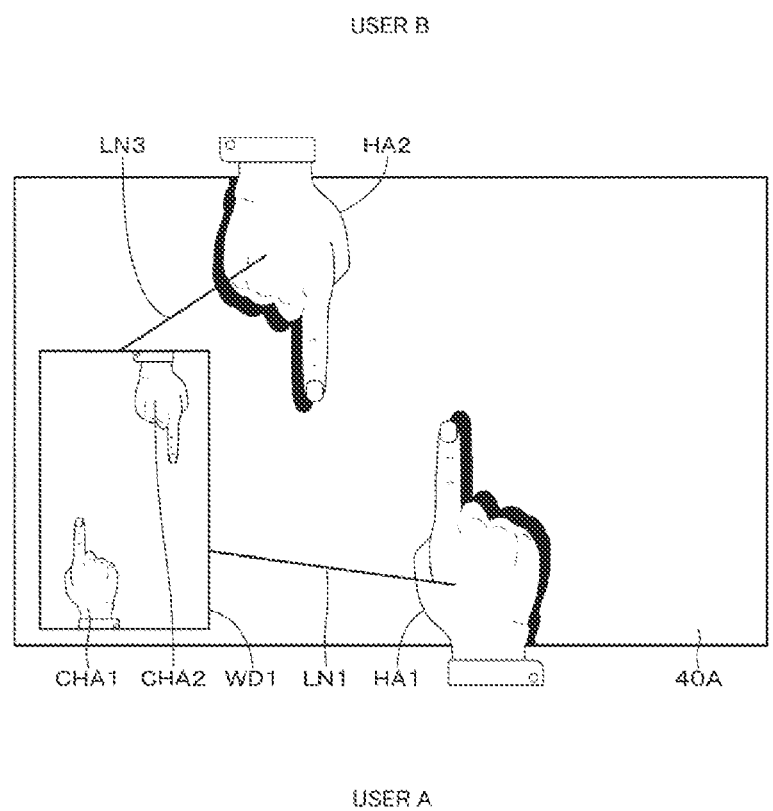
FIG. 26 is a diagram illustrating still another projection display example of the window or the like according to the second embodiment.

The example in which the window is projected and displayed for each user when a plurality of users use the information processing system 10 has been described above. However, a window may be projected and displayed so that the window is common to some or all of the users. For example, as illustrated in FIG. 25A, when the window WD1 corresponding to the user A is projected and displayed, the user B participates in as a user of the information processing system 10 and holds up the hand HA2 on the top surface 40A. When the shape of the hand HA2 transitions to a shape of performing pointing, as illustrated in FIG. 25B, the CG hand CHA2 corresponding to the hand HA2 is projected and displayed within the window WD1. The input information accompanied with operations of the hands HA1 and HA2 is projected and displayed within the window WD1 which is a window common to the users A and B. As illustrated in FIG. 25B, the line LN1 connecting the hand HA1 to the window WD1 and a line LN3 connecting the hand HA2 to the window WD1 may be projected and displayed. As illustrated in FIG. 26, when a plurality of CG hands (in the illustrated example, the hands CHA1 and CHA2) are projected and displayed within the window WD1, the size of the window WD1 may be expanded. Thus, it is possible to prevent the input information which is projected and displayed within the window WD1 and is based on the input performed by the plurality of hands HA from being complicated.

By projecting and displaying the window in this aspect, it is possible to project and display the input information within the window WD when the users A and B cooperate. Whether the window is projected and displayed for each user or the window common to the plurality of users is projected and displayed may be able to be set as a mode.

As in the first embodiment, based on a change in the shape of the hand HA1, a colored portion (not illustrated) which is an example of the starting point of the input start is projected and displayed at the fingertip of the hand CHA1. Based on a change in the shape of the hand HA2, a colored portion (not illustrated) which is an example of the starting point of the input start is projected and displayed at the fingertip of the hand CHA2.

Next, an example of a flow of a process according to the second embodiment will be described with reference to the flowcharts of FIGS. 27 and 28. In the following description, differences from the process of the first embodiment will be mainly described.

Figure 27:
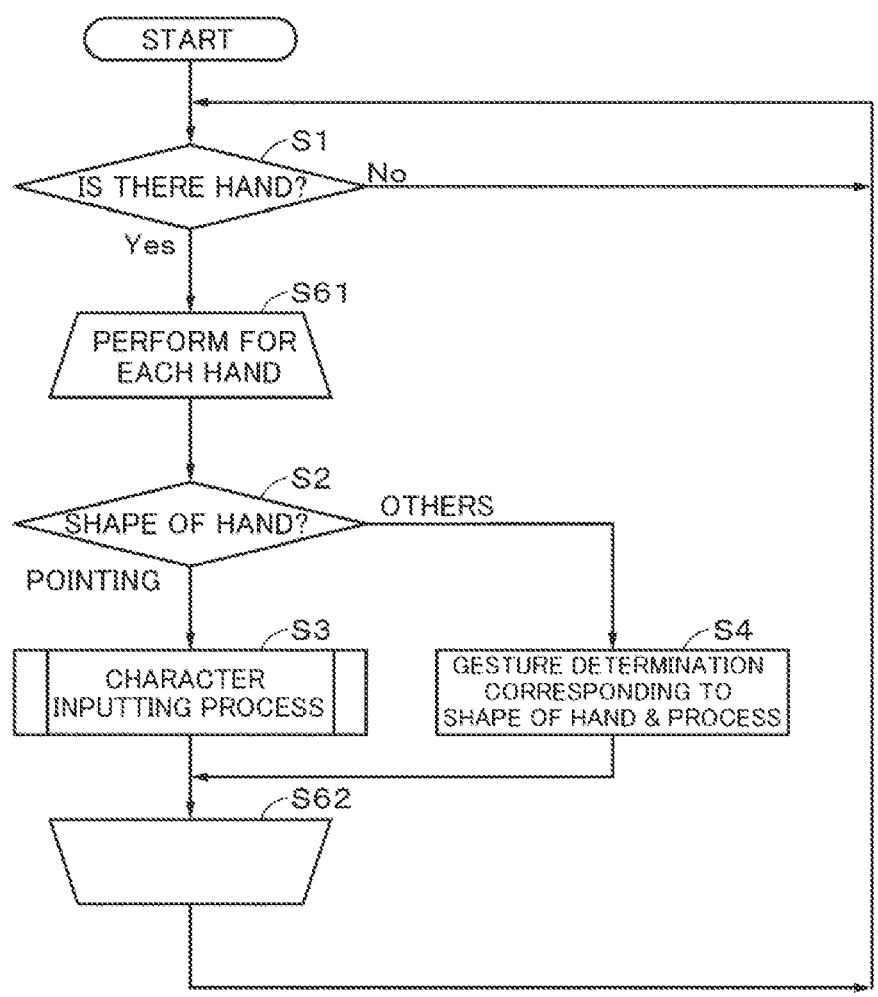
FIG. 27 is a flowchart illustrating an example of a flow of a process (an entire flow of a process) performed in the information processing system according to the second embodiment.

The process in steps S1 to S4 illustrated in the flowchart of FIG. 27 is a similar process to that of the first embodiment. As illustrated in steps S61 and S62 of the flowchart of FIG. 27, the process in steps S2 to S4 is performed for each of a plurality of hands of users (specifically, every number of users).

Content of a character inputting process according to the second embodiment is basically the same as that of the first embodiment. In the character inputting process according to the second embodiment, a window may be drawn for each user or a window common to a plurality of users may be drawn. Based on positions of hands of a plurality of users recognized by the recognition unit 51, it may be determined whether a window is drawn for each user or a window common to a plurality of users is drawn. A flow of this process will be described with reference to the flowchart of FIG. 28.

Figure 28:
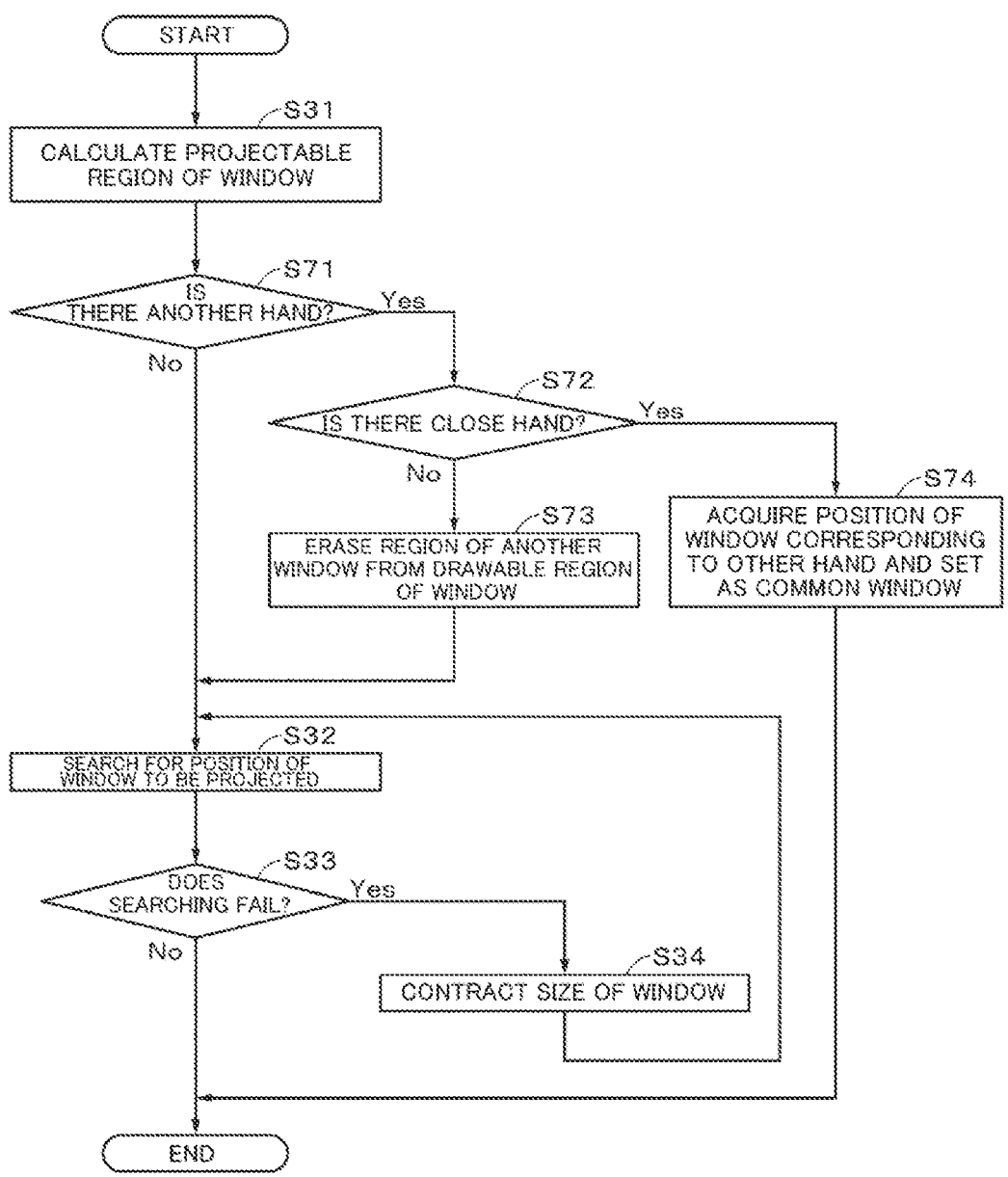
FIG. 28 is a flowchart illustrating an example of a flow of a process (a flow of a process of determining a position of a window) performed in the information processing system according to the second embodiment.

In the flowchart illustrated in FIG. 28, in step S31, a projectable region of a window for a predetermined hand is calculated. Then, the process proceeds to step S71.

In step S71, it is determined whether there is another hand recognized by the recognition unit 51 except for the predetermined hand. When there is no other hand, that is, the number of hands is one, the process proceeds to step S32 and the process in steps S32 to S34 described above is performed.

When it is determined that there is the other hand in the determination process of step S71, the process proceeds to step S72. A region in which a window related to the other hand is disposed is assumed to be already set. In step S72, it is determined whether a distance between a predetermined hand and the other hand is within a threshold, that is, there is a hand close to the predetermined hand. When there is no hand close to the predetermined hand, the process proceeds to step S73.

In step S73, a region of the window related to the other hand is removed from a projectable region of the window related to the predetermined hand. Then, the process proceeds to step S32. Through this process, the window can be set for each hand of the user. When there is the hand close to the predetermined hand in the determination process of step S72, the process proceeds to step S74.

In step S74, a position of the window corresponding to the other hand is acquired and the window is set as a window corresponding to the predetermined hand. Specifically, a CG hand corresponding to the other hand and a CG hand corresponding to the predetermined hand are projected and displayed within the window corresponding to the other hand. Then, the process ends.

As described above, the information processing system 10 may be used by a plurality of users. For example, when each user separately perform an input or cooperate by performing the input mutually, a window appropriate in accordance with a purpose of the information processing system 10 can be projected and displayed.

In the embodiment, a plurality of user may be located on the same long side. For example, the information processing system according to the embodiment may be applied to a training application and a size of the window may be able to be set depending on whether a single person works or a plurality of users work. When the input information of each of the plurality of users is projected and displayed within the same window, color of the input information may be set differently so that the input information of each user can be distinguished in the projection and display.

Third Embodiment

Next, a third embodiment will be described. The description of the first and second embodiments can also be applied to the third embodiment unless otherwise mentioned. The same reference numerals are given to the same and homogenous configurations as the above-described configurations and repeated description will be omitted.

Figure 29:
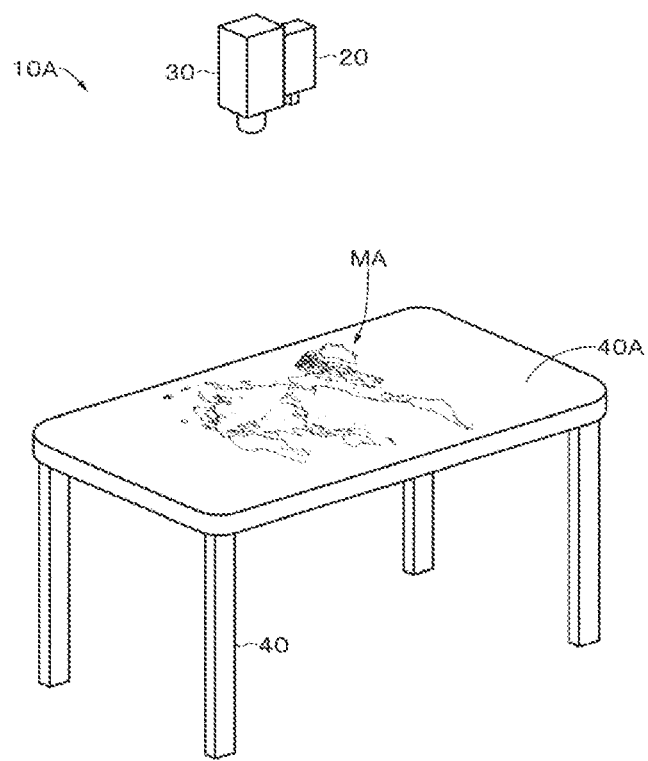
FIG. 29 is a diagram illustrating a configuration example of an information processing system according to a third embodiment.

FIG. 29 is a diagram illustrating a configuration example of an information processing system (an information processing system 10A) according to the third embodiment. The information processing system 10A has the same configuration as the information processing system 10 except that the article 70 is not put on the top surface 40A of the table 40.

A predetermined object is projected and displayed on the top surfaces 40A via the output unit 30. In the embodiment, a world map (hereinafter appropriately referred to as a map MA) is projected and displayed as the predetermined object. A shape of the map MA and a position at which each nation on the map MA is projected and displayed are acquired via the input unit 20 and are recognized by the recognition unit 51.

Figure 30:
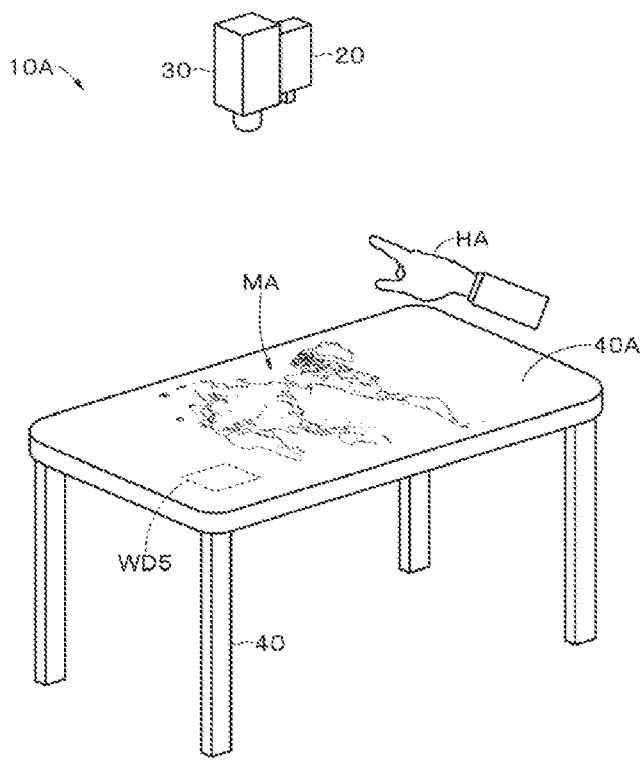
FIG. 30 is a diagram illustrating a usage example of the information processing system according to the third embodiment.

As illustrated in FIG. 30, the hand HA of the user is held over the top surface 40A. For example, when a posture of bending three fingers, a middle finger, a ring finger, and a little finger, is detected as a posture of the hand HA, a mode of the control unit 50 is set as a magnifying lens mode. When the mode of the control unit 50 is set as the magnifying lens mode, a window WD5 is set and the window WD5 is projected and displayed on the top surface 40A as in the first embodiment. For example, as illustrated in FIG. 30, the window WD5 is projected and displayed at a portion which does not overlap the map MA.

Within the window WD5, the portion of the map MA visually shielded by the hand HA (hidden by the shade of the hand HA) is projected and displayed. For example, the portion of the map MA projected and displayed immediately below the hand HA is projected and displayed within the window WD5. The portion of the map MA projected and displayed immediately below and near the hand HA may be projected and displayed within the window WD5.

Figure 31:
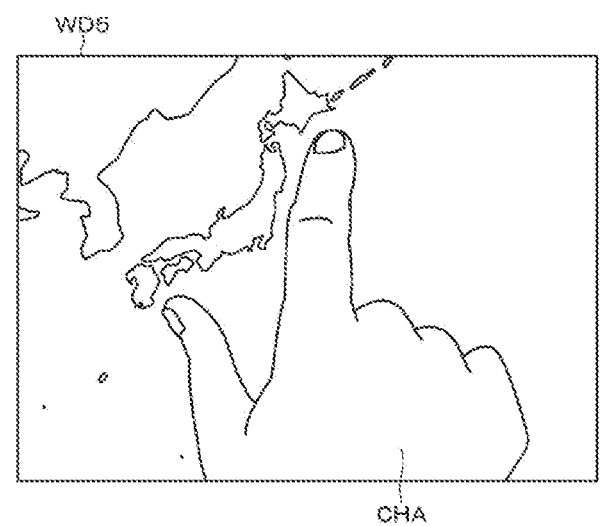
FIG. 31 is a diagram illustrating a projection display example within a window according to the third embodiment.

FIG. 31 is a diagram illustrating a projection and display example within the window WD5. For example, an example will be assumed in which the vicinity of Japan in the map MA is visually shielded by the hand HA. In this example, as illustrated in FIG. 31, the vicinity of Japan in the map MA is projected and displayed within the window WD5. The CG hand CHA resembling the shape of the hand HA is projected and displayed within the window WD5. In the magnifying lens mode, a portion projected and displayed within the window WD5 is scaled through a pinch-in/out operation by the hand HA.

An input start performed using the hand HA is detected. The input start is detected by the control unit 50 (for example, the display control unit 53), for example, as follows. When the input start is detected, a colored portion which is an example of the starting point of the input start is projected and displayed under the control of the display control unit 53. In this example, since a pinch-in/out operation is performed with the tip of a thumb and the tip of an index finger, the colored portion is projected and displayed to each of the tip of the thumb and the tip of the index finger.

Figure 32A:
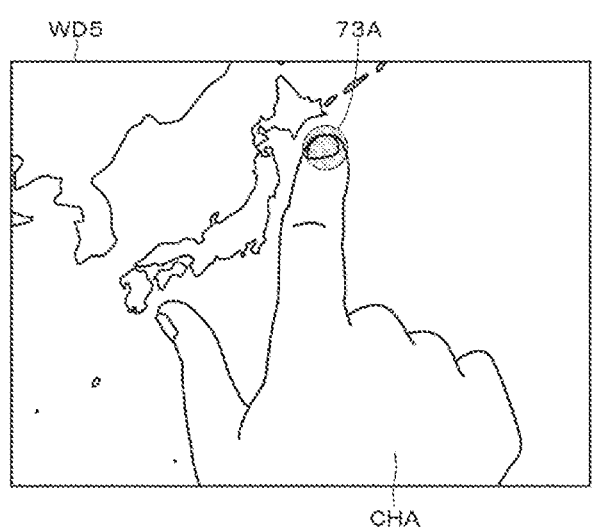
FIGS. 32A and 32B are diagrams illustrating a specific example in which a display control unit projects and displays a starting point of an input according to the third embodiment.

A specific example in which the display control unit 53 projects and displays the starting point of the input start will be described. A height from the top surface 40A to the back of the hand HA is H5. A height from the top surface 40A to the index finger of the hand HA is H5A. When a difference between the height H5 and the height H5A is detected to be greater than a defined amount which is a threshold, an input is determined to be started. As illustrated in FIG. 32A, the display control unit 53 projects and displays a colored portion 73A at the tip of the index finger.

Figure 32B:
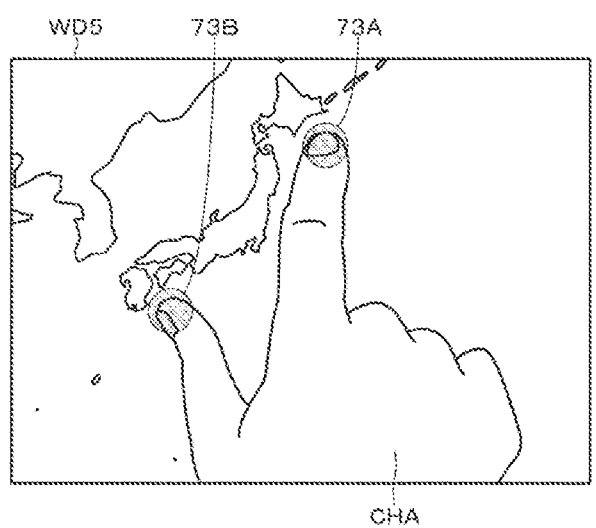

A height from the top surface 40A to the thumb of the hand HA is H5B. When a difference between the height H5 and the height H5B is also detected to be greater than the defined amount which is a threshold, an input is determined to be started. As illustrated in FIG. 32B, the display control unit 53 also projects and displays a colored portion 73B at the tip of the thumb In this way, in the embodiment, a plurality of starting points of the inputs are projected and displayed. Depending on the positions of the index finger and the thumb, the colored portion 73B is first projected and displayed in some cases and the colored portions 73A and 73B are projected and displayed almost simultaneously in some cases.

Figure 33:
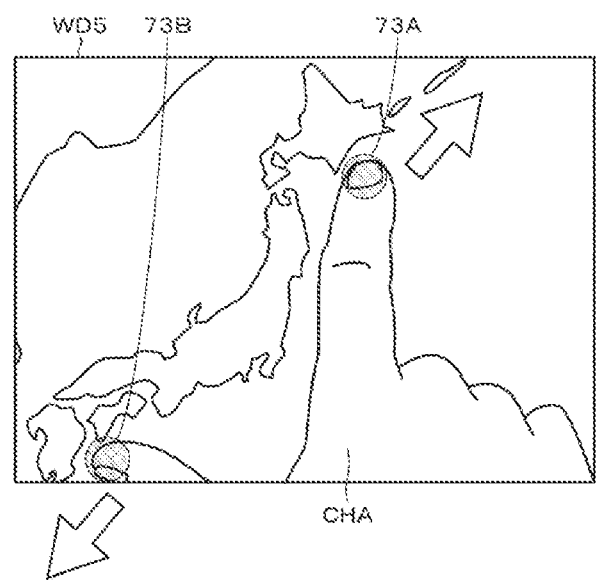
FIG. 33 is a diagram that will be referred to when a portion projected and displayed within a window is scaled in response to an operation.

When the colored portions 73A and 73B are projected and displayed, the user recognizes that the pinch-in/out inputting operation can be accepted by the information processing system 10A. The user performs the pinch-in/out operation using the hand HA. In accordance with the operation, as illustrated in FIG. 33, the hand CHA within the window WD5 is also linked and moved. A portion near Japan projected and displayed within the window WD5 is expanded or contracted in accordance with a change in a distance between two points between the index finger and the thumb. In this way, the user can turn his or her eyes to the window WD5 to confirm an aspect in which a part of a projected and displayed object is expanded or contracted.

For example, it is assumed that the hand HA is moved (and the posture of the hand HA may be changed at the time of movement) after a pinch-out operation is performed with the hand HA and the vicinity of Japan within the window WD5 is expanded. With the movement of the hand HA, a predetermined portion (for example, the vicinity of China) of the map MA shielded by the hand HA of a movement destination is projected and displayed within the window WD5. At this time, as an expansion ratio of the projected and displayed redetermined portion of the map MA, an expansion ratio set through a pinch-out operation by the hand HA before movement is maintained. The same goes for a contraction ratio. Thus, it is not necessary for the user to set the expansion ratio or the contraction ratio set once again.

A scaling operation may be an operation other than a pinch-in/out operation. The scaling operation of the top surface 40A may be a double tapping operation or a pushing operation. A sensor (for example, a pressure sensitive sensor) that detects the operation may be provided on the top surface 40A.

Fourth Embodiment

Next, a fourth embodiment will be described. The description of the first, second, and third embodiments can also be applied to the fourth embodiment unless otherwise mentioned. The same reference numerals are given to the same and homogenous configurations as the above-described configurations and repeated description will be omitted.

Figure 34:
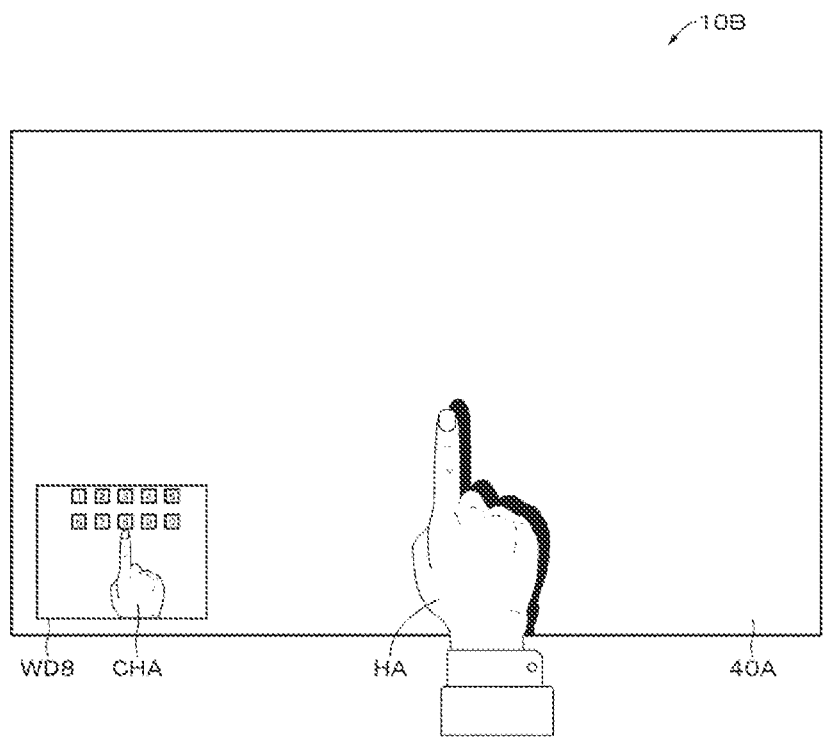
FIG. 34 is a diagram illustrating a configuration example of an information processing system according to a fourth embodiment.

FIG. 34 is a diagram illustrating a configuration example of an information processing system (an information processing system 10B) according to the fourth embodiment. The information processing system 10B has basically the same configuration and function as the information processing system 10 except that the article 70 is not put on the top surface 40A.

Figure 35:
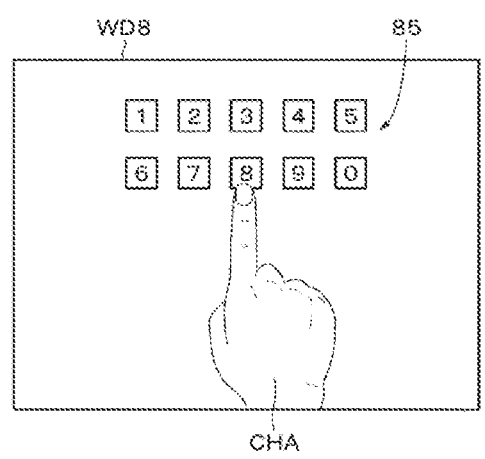
FIG. 35 is a diagram illustrating a projection display example within a window according to the fourth embodiment.

When the recognition unit 51 recognizes the hand HA of the user, the display control unit 53 sets a window WD8 and projects and displays the window WD8 on the top surface 40A. In the fourth embodiment, a character or the like is not projected and displayed in the window WD8, as illustrated in FIG. 35, for example, a number button array is projected and displayed within the window WD8. As a specific example, a number input unit 85 in which a button array of 1 to 5 and a button array of 6 to 9 and 0 are disposed at two upper and lower stages is projected and displayed within the window WD8. Number buttons are not projected and displayed on the top surface 40A except for the window WD8.

The user takes a posture of bending the hand HA other than the index finger and then moves the hand HA to face the tip of the index finger to a number desired to be input. In connection with the motion of the hand HA, the motion of the hand CHA within the window WD8 is also linked. The user confirms a motion of the hand CHA within the window WD8 while moving the hand HA, moves the hand CHA to the button of the desired number, and performs an operation of lowering and pushing the tip of the index finger. When the recognition unit 51 recognizes an operation of lowering the tip of the index finger, a number below the tip of the index finger at this time is handled as an input value. The input value is used as a value of calculation or an input or the like of an encrypted number. Since the window WD8 is not shielded by the hand HA, the user can accurately recognize the button input by the own user.

In the embodiment, for example, when a region in which the tip of the index finger overlaps the button of the number within the window WD8 is equal to or greater than a threshold, projection and display in which the button can be distinguished from the other buttons may be performed to show that the button can be input. For example, only the inputtable buttons of numbers may be colored to distinguished from the color of the other buttons. When the region in which the tip of the index finger overlaps the button of the number within the window WD8 is equal to or greater than the threshold, the colored portion (for example, the colored portion 71) described in the first embodiment or the like may be projected and displayed at the tip of the index finger. In this way, the starting point of the input start may indicate that a projected and displayed predetermined portion can be operated in a contactless manner.

Modification Examples

The plurality of the embodiments of the present disclosure have been described above specifically, but the content of the present disclosure is not limited to the above-described embodiments and various modifications based on the technical spirit of the present disclosure can be made. Hereinafter, modification examples will be described.

A projection surface on which projection and display are realized may be a floor, a wall, or the like other than a table. The projection surface is preferably flat. However, for example, when a flat region is small, an uneven surface may be set as the projectable region PAR. For example, an uneven surface including a certain flat surface and a top surface of an object put on the flat surface may be set as the projectable region PAR.

The starting point of the input start may be the tip of a pen or the like in addition to a fingertip. An aspect of the projection and display for the starting point of the input start may be not only a circular shape but also a triangular shape or a rectangular shape, may be a planar shape without being limited to a dot shape, or may be a 3-dimensional shape.

In the above-described embodiments, the processes performed by the control unit may not necessarily be processes set as the mode and the processes may be performed independently and separately. Some of the above-described processes may be performed in appropriate functional blocks of the control unit 50. The order of the above-described processes may be changed appropriately or the plurality of processes may be performed in parallel. The processes according to the embodiments may be performed in combination.

The present disclosure can be realized by a device, a method, a program, a system, or the like. For example, a device that can download a program for realizing the functions described in the above-described embodiments and does not have the functions described in the embodiments can download and install the program, and the device can perform the control described in the embodiment. The present disclosure can be realized by a server that distributes the program. The description of the embodiments and the modification examples can be appropriately combined.

The content of the present disclosure is not limited by the advantageous effects exemplified in the present disclosure and should not be construed to be limited.

The present disclosure can be configured as follows.

(1)

An information processing device including:
a control unit configured to set an input auxiliary region based on an acquired sensing result of an operator and display a starting point of an input start within the input auxiliary region when the input start performed using the operator is detected.

(2)

The information processing device according to (1), wherein the input auxiliary region is set within a projectable region determined based on at least a position of the operator.

(3)

The information processing device according to (2), wherein the projectable region includes a region which is not shielded visually by the operator.

(4)

The information processing device according to (3), wherein the projectable region includes a region in which a real object put on a plane including the projectable region is avoided.

(5)

The information processing device according to any one of (2) to (4),
wherein the input auxiliary region and the projectable region are substantially a same plane.

(6)

The information processing device according to any one of (2) to (5),
wherein the control unit gives a predetermined notification when the input auxiliary region with a predetermined size which is defined in advance is not settable within the projectable region.

(7)

The information processing device according to (6), wherein the predetermined notification is a notification on expanding the projectable region.

(8)

The information processing device according to any one of (2) to (7),
wherein the control unit displays information for associating the operator with the input auxiliary region.

(9)

The information processing device according to any one of (1) to (9),
wherein the control unit displays input information in accordance with an input performed using the operator within the input auxiliary region.

(10)

The information processing device according to (9), wherein the control unit displays the virtual operator within the input auxiliary region and changes a size of the input auxiliary region based on a relation between a position of the virtual operator and the input auxiliary region.

(11)

The information processing device according to any one of (1) to (10),
wherein the control unit resets the input auxiliary region based on a relation between a position of the operator and the input auxiliary region.

(12)

The information processing device according to any one of (1) to (11), wherein the control unit sets an input auxiliary region of each operator based on acquired sensing results of a plurality of the operators.

(13)

The information processing device according to any one of (1) to (11),
wherein the control unit sets an input auxiliary region common to a plurality of the operators based on acquired sensing results of the plurality of operators.

(14)

The information processing device according to any one of (1) to (13),
wherein the control unit expands or contracts display within the input auxiliary region in response to a predetermined operation by the operator.

(15)

The information processing device according to any one of (1) to (14),
wherein the control unit displays the input auxiliary region.

(16)

The information processing device according to any one of (1) to (15),
wherein the control unit displays starting points of a plurality of the input starts.

(17)

An information processing method including:
allowing a control unit to set an input auxiliary region based on an acquired sensing result of an operator and display a starting point of an input start within the input auxiliary region when the input start performed using the operator is detected.

(18)

A program causing a computer to perform:
an information processing method of allowing a control unit to set an input auxiliary region based on an acquired sensing result of an operator and display a starting point of an input start within the input auxiliary region when the input start performed using the operator is detected.

REFERENCE SIGNS LIST 10, 10A, 10B Information processing system
20 Input unit
30 Output unit
50 Control unit
51 Recognition unit
52 Storage control unit
53 Display control unit
71 Coloring portion
HA Hand
CHA CG hand
WD Window
PAR Projectable region

The invention claimed is:

1. An information processing device, comprising:
a control unit configured to:
acquire a sensing result associated with detection of an operator;
set a first input auxiliary region based on the acquired sensing result of the operator;
detect a start of an input operation by the operator;
control display of a starting point of the input operation within the first input auxiliary region based on the detected start of the input operation;
control display of a virtual operator within the first input auxiliary region;
recognize the input operation by the operator;
control display of input information within the first input auxiliary region based on the recognized input operation; and
change a size of the first input auxiliary region based on a relation between a position of the displayed virtual operator and the first input auxiliary region.

2. The information processing device according to claim 1, wherein the control unit is further configured to set the first input auxiliary region within a projectable region based on at least a position of the operator.

3. The information processing device according to claim 2, wherein the projectable region includes a region which is visually unshielded by the operator.

4. The information processing device according to claim 3, wherein
the projectable region includes a first region of a plane,
a real object is in a second region of the plane, and
the first region is different from the second region of the plane.

5. The information processing device according to claim 2, wherein the first input auxiliary region and the projectable region are substantially the same plane.

6. The information processing device according to claim 2, wherein the control unit is further configured to control output of a notification in a case where the first input auxiliary region with a determined size is not settable within the projectable region.

7. The information processing device according to claim 6, wherein the notification is for expansion of the projectable region.

8. The information processing device according to claim 2, wherein the control unit is further configured to display specific information for association of the operator with the first input auxiliary region.

9. The information processing device according to claim 1, wherein the control unit is further configured to reset the first input auxiliary region based on a relation between a position of the operator and the first input auxiliary region.

10. The information processing device according to claim 1, wherein the control unit is further configured to:
acquire a plurality of sensing results of a plurality of operators, wherein
the plurality of sensing results includes the sensing result, and
the plurality of operators includes the operator; and
set a plurality of input auxiliary regions based on the acquired plurality of sensing results, wherein
each input auxiliary region of the plurality of input auxiliary regions corresponds to a respective operator of the plurality of operators, and
the plurality of input auxiliary regions includes the first input auxiliary region.

11. The information processing device according to claim 1, wherein the control unit is further configured to:
acquire a plurality of sensing results of a plurality of operators, wherein
the plurality of sensing results includes the sensing result, and
the plurality of operators includes the operator; and
set a second input auxiliary region common to the plurality of operators based on the acquired plurality of sensing results.

12. The information processing device according to claim 1, wherein the control unit is further configured to one of expand or contract display within the first input auxiliary region based on a determined operation by the operator.

13. The information processing device according to claim 1, wherein the control unit is further configured to control display of the first input auxiliary region.

14. The information processing device according to claim 1, wherein
the control unit is further configured to control display of a plurality of starting points of a plurality of input starts, and
the plurality of starting points includes the starting point.

15. An information processing method, comprising:
acquiring a sensing result associated with detection of an operator;
setting an input auxiliary region based on the acquired sensing result of the operator;
detecting a start of an input operation by the operator;
controlling display of a starting point of the input operation within the input auxiliary region based on the detected start of the input operation;
controlling display of a virtual operator within the input auxiliary region;
recognizing the input operation by the operator;
controlling display of input information within the input auxiliary region based on the recognized input operation; and
changing a size of the input auxiliary region based on a relation between a position of the displayed virtual operator and the input auxiliary region.

16. A non-transitory computer-readable medium having stored thereon, computer-executable instructions, which when executed by computer, cause the computer to execute operations, the operations comprising:
acquiring a sensing result associated with detection of an operator;
setting an input auxiliary region based on the acquired sensing result of the operator;
detecting a start of an input operation by the operator;
controlling display of a starting point of the input operation within the input auxiliary region based on the detected start of the input operation;
controlling display of a virtual operator within the input auxiliary region;
recognizing the input operation by the operator;
controlling display of input information within the input auxiliary region based on the recognized input operation; and
changing a size of the input auxiliary region based on a relation between a position of the displayed virtual operator and the input auxiliary region.

* * * * *